(12) United States Patent
Fujita et al.

(10) Patent No.: US 7,809,753 B2
(45) Date of Patent: Oct. 5, 2010

(54) SYSTEM AND METHOD FOR SELECTIVE ADVERTISING

(75) Inventors: Takeshi Fujita, Chiba (JP); Hitoshi Endoh, Saitama (JP); Nariaki Hatta, Tokyo (JP); Yasufumi Fujikawa, Kanagawa (JP); Yutaka Sato, Tokyo (JP); Ryota Makiyama, Tokyo (JP); Mariko Kobayashi, Kanagawa (JP); Seiji Kanai, Kanagawa (JP); Fumio Tsuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 10/398,955

(22) PCT Filed: Oct. 12, 2001

(86) PCT No.: PCT/JP01/09002

§ 371 (c)(1),
(2), (4) Date: Aug. 8, 2003

(87) PCT Pub. No.: WO02/31694

PCT Pub. Date: Apr. 18, 2002

(65) Prior Publication Data

US 2004/0015492 A1    Jan. 22, 2004

(30) Foreign Application Priority Data

Oct. 12, 2000   (JP) .............................. 2000-312696

(51) Int. Cl.
*G06Q 30/00* (2006.01)
*G06F 7/00* (2006.01)
*G06F 17/30* (2006.01)

(52) U.S. Cl. ....................... 707/791; 707/706; 707/758; 707/781; 705/14.4

(58) Field of Classification Search .............. 707/104.1, 707/706, 758, 781, 791; 705/14.4
See application file for complete search history.

(56) References Cited

U.S. PATENT DOCUMENTS 5,668,966 A * 9/1997 Ono et al. .................... 715/853

(Continued)

FOREIGN PATENT DOCUMENTS

JP          10-307831          11/1998

(Continued)

OTHER PUBLICATIONS

Mikihiko Mori et al., "Bookmark Agent ni you URL no Kyouchou-texi Joho filtering", Dai 29kai Jinkou Chinou Kiso-ron Kenkyuu-Kai Shiryou, (SIG-FAI-9701-2), Jun. 1997, pp. 7 to 12.

(Continued)

*Primary Examiner*—Charles E Lu
(74) *Attorney, Agent, or Firm*—Finnegan, Henderson, Farabow, Garrett & Dunner, L.L.P.

(57) ABSTRACT

The present invention relates to a system having an information image management server, an advertising agency terminal and a client computer connected with one another via a network, in which the information image management server extracted a client computer which meets a client specifying condition on the basis of client specifying condition information from the advertising agency terminal, then a message to carry out update or addition of an information image recorded in a management area of the extracted client computer is transmitted to the extracted client, and the client computer which has received the message carries out update or addition of an information image in accordance with the message.

4 Claims, 16 Drawing Sheets

U.S. PATENT DOCUMENTS

| | | | |
|---|---|---|---|
| 5,884,309 A * | 3/1999 | Vanechanos, Jr. | 707/10 |
| 6,141,010 A * | 10/2000 | Hoyle | 715/854 |
| 6,182,116 B1 * | 1/2001 | Namma et al. | 709/204 |
| 6,366,298 B1 * | 4/2002 | Haitsuka et al. | 715/736 |
| 6,487,538 B1 * | 11/2002 | Gupta et al. | 705/14 |
| 6,698,020 B1 * | 2/2004 | Zigmond et al. | 725/34 |
| 2002/0019768 A1 * | 2/2002 | Fredrickson et al. | 705/14 |

FOREIGN PATENT DOCUMENTS

| | | |
|---|---|---|
| JP | 11-134353 | 5/1999 |
| JP | 11-338809 | 12/1999 |
| JP | 2000-165845 | 6/2000 |
| JP | 2000-187666 | 7/2000 |
| JP | 2000-231590 | 8/2000 |

OTHER PUBLICATIONS

Tomonari Kamiba et al., "User Profile Kanri Agent no Teian to Shisaku", Joho Shori Gakkai Kenkyuu Houkouku, 97-HI-70, Jan. 1997, vol. 97, No. 2, pp. 1 to 8.

Toshiaki Matsumoto, "Sony ya Nifty mo Sansen 'Kanarazu Todoku' Denshi Mail Koukoku", Nikkei Multimedia, Jul. 1998, No. 37, pp. 88-93.

International Search Report for corresponding PCT Application No. PCT/JP01/09002 dated Nov. 20, 2001.

Translation of International Preliminary Examination Report for corresponding PCT Application No. PCT/JP01/09002 dated Mar. 25, 2003.

* cited by examiner

| CLIENT ID | INFORMATION REGISTRATION INFORMATION 1 | | | INFORMATION IMAGE REGISTRATION INFORMATION 2 | | | ... |
|---|---|---|---|---|---|---|---|
| | INFORMATION IMAGE ID | REGISTRATION DATE AND TIME | OTHER | INFORMATION IMAGE ID | REGISTRATION DATE AND TIME | OTHER | |
| 1231131345 | 24641342jpg | 2000/9/6 12:30 | ... | 8979749jpg | 2000/10/5 11:00:00 | ... | ... |
| 464658241 | 0031121jpg | 2000/2/28 9:11 | ... | ... | ... | ... | ... |
| ... | ... | ... | ... | ... | ... | ... | ... |

FIG.2

| CLIENT ID | AGE | SEX | OCCUPATION | INTERESTS | ... |
|---|---|---|---|---|---|
| 123131345 | 40 | MALE | SELF-EMPLOYED | DRAMA ... | ... |
| 464658241 | 19 | FEMALE | STUDENT | MUSIC ... | ... |
| ... | ... | ... | ... | ... | ... |

EXTRACTION RESULT DISPLAY SCREEN

ADVERTISING AGENCY TERMINAL ID ▭ —1301

EXTRACTION CONDITIONS —1302
- INFORMATION IMAGE ID OR FILE NAME ▭ ⊙ AND ○ OR ○ NOT ▭
- INFORMATION IMAGE ID OR FILE NAME ▭ ⊙ AND ○ OR ○ NOT ▭

THE NUMBER OF CLIENTS WHO MEET THE EXTRACTION CONDITIONS IS ▭ —1303

THE COST REQUIRED FOR DISTRIBUTION IS ▭ YEN —1304

> DETAILED DISPLAY —1801
CANCEL —1305
UPDATE EXECUTION —1306

FIG.18

CLIENT DETAILED INFORMATION DISPLAY SCREEN

—1901

| | CLIENT ID | AGE | SEX | OCCUPATION | INTERESTS |
|---|---|---|---|---|---|
| 1 | 12641467 | 40 | MALE | SELF-EMPLOYED | DRAMA··· |
| 2 | 4567913 | 19 | FEMALE | STUDENT | MUSIC··· |
| 3 | 7861313 | 32 | FEMALE | COMPANY EMPLOYEE | SHOPPING |
| 4 | 15666136 | 38 | MALE | COMPANY EMPLOYEE | FISHING, GOLF |
| 5 | 126467673 | 15 | MALE | STUDENT | SPORTS, MUSIC |
| 6 | 134646 | 50 | MALE | BUSINESS MANAGER | MUSIC··· |
| 7 | 1346466 | 22 | FEMALE | NONE | OUTDOOR ACTIVITY |
| ⋮ | ⋮ | ⋮ | ⋮ | ⋮ | ⋮ |

1902 — < RETURN

FIG.19

SYSTEM AND METHOD FOR SELECTIVE ADVERTISING

TECHNICAL FIELD

This invention relates to an information image providing system and an information image management server for updating or adding an information image so that an information image which an information provider wants to be visually recognized can be provided to a terminal user conforming to a predetermined condition at an information terminal, which is mainly a personal computer or the like.

BACKGROUND ART

Conventionally, on the Internet, which is broadly used for transmission of information, a program for Internet connection distributed by an Internet service provider to each user is proposed and actually used, which includes a function to display a special window in a display part of a user terminal machine and display an advertising image through this window, or which uses a layout having a display of news or the like combined with an advertising banner, as an advertising technique.

There is also used a technique of transmitting advertising information or the like through an e-mail to a pre-logged user.

These techniques might cause an increase in the advertising cost and distribution cost and excessive use of communication resources of the network, since advertising information is equally distributed to all the users irrespective of whether or not the users are interested in the distributed advertising information.

DISCLOSURE OF THE INVENTION

In view of the foregoing background art, it is an object of the present invention to realize an efficient information transmission technique in which an information provider provides information, e.g., advertising information, selects users to be advertisement distribution targets in advance based on an information image previously acquired by the users, and provides a desired information image to only the selected users.

In order to achieve the above-described object, an information providing system according to the present invention has a client computer, an information image management server, and an advertising agency terminal. The information providing system manages an information image including image information and related information recorded at the client computer, thereby providing information to the client computer.

The term "information image" used in this invention means a package to be handled in one unit which consists of image information and related information prescribing at least specific processing. Information image and image information refer to distinctly different concepts.

The client computer has a management area. The management area functions to record an information image and notify the information image management server of this recorded information image.

The advertising agency terminal sends client specifying condition information to the information image management server and requests the information image management server to update or add a predetermined information image only to a client computer which satisfies the condition.

The information image management server, in response to the request from the advertising agency terminal, updates or adds an information image with respect to the client computer which satisfies the conditions included in the client specifying condition information.

A client information recording unit of the information image management server operates to record information of a registered information image sent from each client computer, for example, information image ID, in association with information for specifying the client computer, for example, client ID.

A client extracting unit of the information image management server receives the client specifying condition information transmitted from the advertising agency terminal. The client specifying condition information includes a condition related to the extraction of a client computer recording what information image and update/addition contents related to how and what information image is updated or what information image is added. The client extracting unit accesses and searches the client information recording unit, thus extracting a client computer which satisfies the conditions included in the client specifying condition information and sending the information specifying the client computer and the update/addition contents to an information image update unit.

The information image update unit of the information image management server generates and sends a message for requesting each of the extracted client computers to execute the update/addition contents. Having received the message, the client computer updates/adds an information image recorded in a second management area in response to the message. As a result, the operator of the client computer can operate the updated information image in the second management area and can acquire new information after the update/addition.

In the description of the present invention, the term "update of information image" means the processing including replacement of all or a part of information images and addition of a new information image. For example, "update of information image" includes the processing to replace image information constituting an information image with another image information, or replace related information including items A and B with related information including items A, B and a new item C, or replace one information image with a plurality of new information images.

When the operator carries out an operation on the basis of the related information of the displayed information image, an operation related to the related information indicated by the operator's operation is carried out. Thus, using the information image as a medium, the information providing system leads the operator of the client computer to the information intended by the operator of the advertising agency terminal, for example, the web page administered by the advertising agency terminal, and allows the operator of the client to browse the information.

In the information providing system according to the present invention, the information image management server further has an extracted client information providing unit for sending back to the advertising agency terminal, extracted client information related to the client computer extracted on the basis of the client specifying condition information from the advertising agency terminal.

The extracted client information providing unit generates extracted client information, for example, information related to the number of clients and the resultant distribution cost, on the basis of the client computer extracted by the client extracting unit, and sends such information to the advertising agency terminal.

Moreover, in the information providing system according to the present invention, the management area of the client computer sends attribute information related to the client computer to the information image management server.

The term "attribute information" means personal information related to the operator of the client computer.

As the client computer sends the attribute information to the information image management server, the information image management server records it in association with the information for specifying the client, for example, the client ID.

Thus, the attribute information about the extracted client computer is provided to the advertising agency terminal and the advertising agency terminal selects client computers on the basis of the attribute information.

An information image management server according to the present invention extracts a client computer which satisfies a client specifying condition on the basis of client specifying condition information from an advertising agency terminal, and updates or adds an information image as a package to be handled in one unit which consists of image information and related information prescribing at least specific processing, recorded in a management area with respect to the extracted client computer.

The client specifying condition information for selecting a client computer to be a target of update or addition of an information image is sent from the advertising agency terminal to the information image management server. The client specifying condition information includes the description related to the presence/absence of an information image designated by the operator of the advertising agency terminal. The information image management server reads the client specifying condition information, extracts a client computer which satisfies the condition on the basis of the condition included in the information, for example, the presence/absence of the information image designated by the operator of the advertising agency terminal, and carries out update or addition of an information image in the management area of the extracted client computer.

By thus using the information image, client management is carried out easily and accurately by the information image management server and the operator of the advertising agency acquires accurate marketing information. Moreover, since predetermined information is provided only to the client computer which satisfies the condition, the effect of the provision of information such as the advertising effect is improved.

The other objects of the present invention and specific advantages provided by the present invention will be clarified further from the following description of embodiments.

BRIEF DESCRIPTION OF THE DRAWINGS

FIG. 2 shows an exemplary structure of a client information recording unit.

FIG. 18 shows an exemplary extraction result display screen displayed by an advertising agency terminal.

FIG. 19 shows an exemplary screen for displaying detailed information.

BEST MODE FOR CARRYING OUT THE INVENTION

Preferred embodiments of the present invention will now be described with reference to the attached drawings.

(1. Common Concept)

First, a common concept of the present invention will be described. Particularly, "information image" according to the present invention will be described in detail.

In the present invention, "information image" means image information containing related information and the like, as a package to be handled in one unit which consists of image information and related information prescribing at least specific processing.

(1.1. Related Information)

Related information will be described. "Related information" is information as the basis of the operation in the case where an operator of a client computer is caused to visually recognize an image and carry out a specific operation using this image as a key. That is, related information is information associated with image information. For example, if an operator of a client is to refer to information existing at a specific server, related information is information specifying that information, such as URL or IP address. If a specific program is to be run, the name of the program or the program itself may be used as "related information." For example, instruction information for acquiring new image information from a web server can be used as "related information."

The information which specifies information may be information specifying an information image file itself or may be the URL of a page as a key to the acquisition of an information image.

(1.2. Information Image Containing Image Information Together with Related Information)

An information image containing related information, which is similarly a common concept of the present invention, will now be described with reference to FIGS. 20 and 21. The information contained in an information image can be related information, an identifier for specifying the image, and attributes of the information image.

Figure 20:
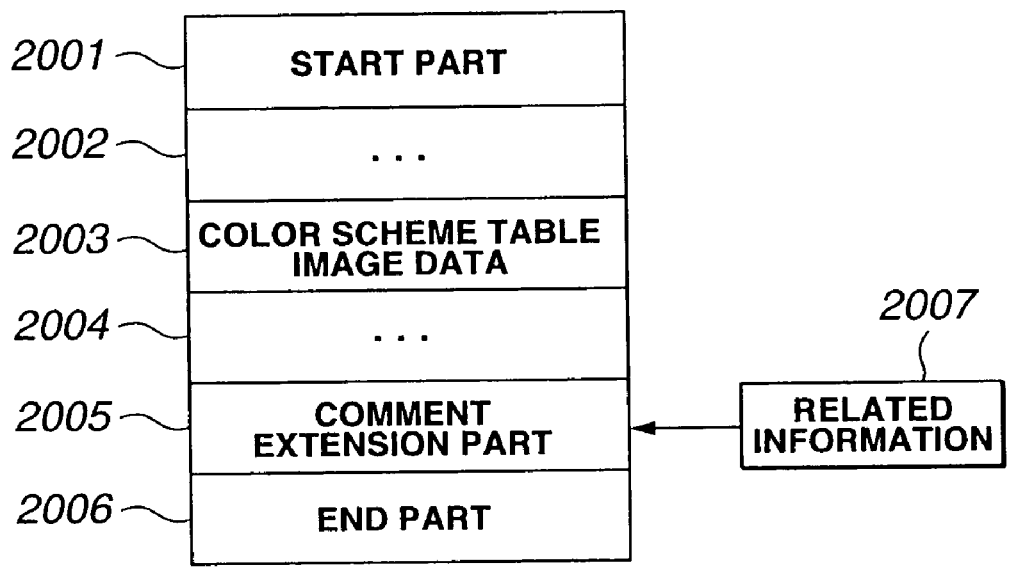
FIG. 20 shows an exemplary format of image information in which related information is embedded.

FIG. 20 shows an exemplary format of image information in which related information is embedded.

The image information in this example uses an image of the GIF format. However, the image format need not be limited to the GIF format but may be an arbitrary file format which is capable of containing related information such as the JPG or JPEG (Joint Photographic Expert Group) format or the PCX format.

A start part 2001 is a field provided for identifying that the present information is image information of the GIF format. A character string "GIF" and its version are allocated thereto.

Color table image data 2003 is image data such that pixels are arranged sequentially from left to right and from up to down. In the case of the GIF format, this data is coded by using an LZW (Lempel Ziv Welch) algorithm a variable length code.

A comment extension part 2005 contains text information which is not graphic information in the GIF data stream. The comment extension part is constituted to include comments about graphics, names of parties concerned with production and explanation of contents, or all the other data about control and data that are not categorized as graphic data. This part is ignored in a typical display.

An end part 2006 indicates the end of the data stream and that no other parameter information follows this part.

A part 2002 between the start part 2001 and the color scheme table image data 2003, and a part 2004 between the color scheme table image data 2003 and the comment extension part 2005, contain other information than the information contained in the parts 2001, 2003 and 2005. For example, information including parameters defining necessary areas on a display device for an image to be drawn is allocated such as screen width, screen height, and color resolution.

Related information 2007 is directly arranged in the comment extension part 2005, or is arranged in the comment extension part 2005 after being processed such as encryption or the like. The related information 2007 is incorporated in the comment extension part 2005 a single piece of image information.

As a result, the image information as a data stream can contain the related information and identifier.

Although the GIF format is used in the above description, other image formats may be used as long as related information and the like can be recorded in an area separate from the image information as described above.

Another embedding format which is different from the embedding format to the image information shown in FIG. 20 will be described with reference to FIG. 21.

Figure 21:
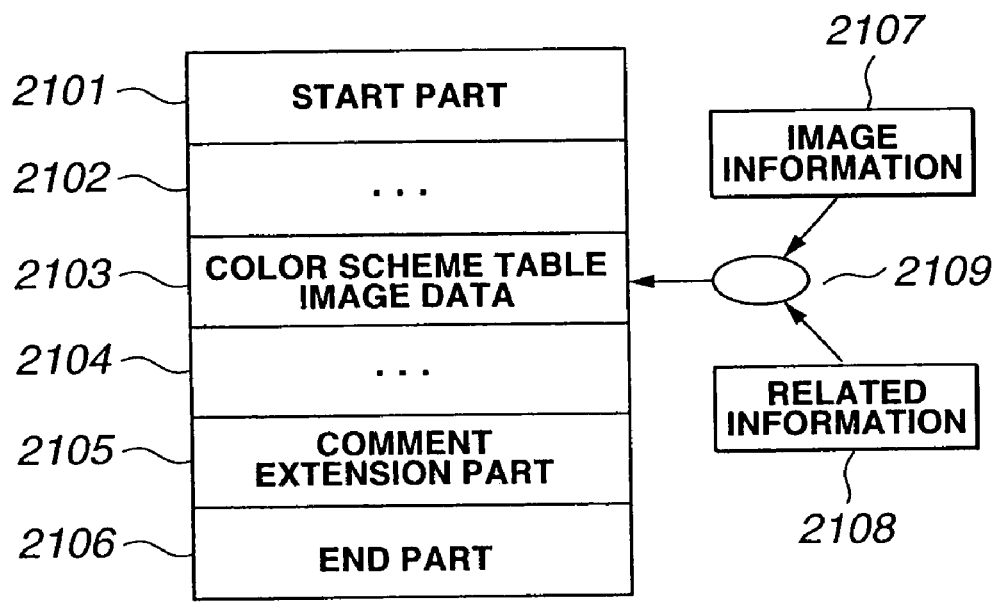
FIG. 21 shows another exemplary format of image information in which related information is embedded.

FIG. 21 shows another exemplary format of image information in which related information is embedded. Again, the image information uses an image of the GIF format. In this example, too, the format need not be limited to the GIF format but may be another arbitrary format such as the JPG format or the PCX format.

A start part 2101 is a field provided for identifying that the present information is image information of the GIF format, similarly to the above-described example. A character string "GIF" and its version are allocated thereto.

Color scheme table image data 2103 is image data such that pixels are arranged sequentially from left to right and from up to down. In this example, image information 2107 and related information 2108 are provided in a mixed manner in the form of a digital watermark, thus preventing visual recognition of the related information while enabling visual recognition of the image information as it is (2109). The information thus mixed is coded by using an LZW algorithm a variable length code.

A comment extension part 2105 contains text information which is not graphic information in the GIF data stream. This field is not particularly required in this example, but if necessary, an information provider can use and freely define this field.

An end part 2106 indicates the end of the data stream and that no other parameter information follows this part.

Although the GIF format is also used in this example of the embedding format, other image formats may be used as long as image information and related information can be recorded in a mixed manner as described above.

(1.3. Graphic Image Displayed at Display Terminal)

Exemplary graphic images displayed at a client according to the present invention will now be described with reference to FIGS. 22 to 25.

(1.3.1. Exemplary Graphic Image Suitable for Computer)

Figure 22:
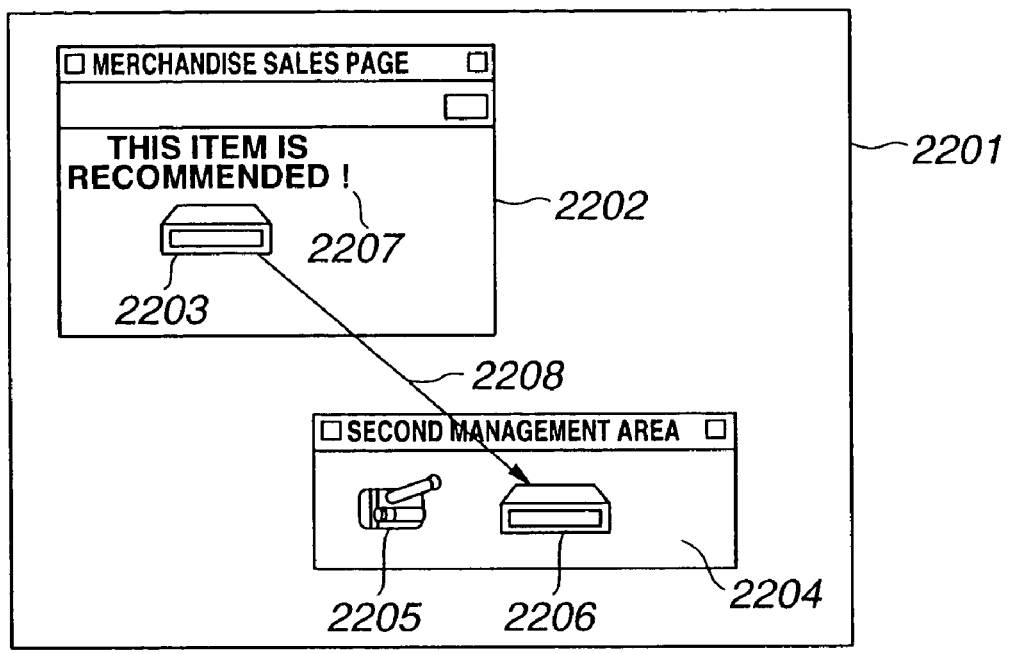
FIG. 22 shows an exemplary graphic image displayed at the client according to the present invention.

First, in the case where a computer which supports an OS enabling graphic display such as Windows 9x, Windows NT, Windows 2000, or Linux is used as a display/operation terminal, it is preferred to employ look and feel as shown in FIG. 22, which will be described hereinafter.

A display screen 2201 is, for example, a cathode-ray tube display screen, a TFT liquid crystal display screen, a screen in an information display device embedded in eyeglasses to be put on a human body, or the like. The display screen 2201 acts so that a person can visually grasp information from the display/operation device. Although the boundary part of the display screen 2201 overlaps the outermost frame of the display device in FIG. 22, the frame may be displayed within the display device.

A one-touch window 2204 is a window for displaying at least images (or image information such as photographs, throughout the following description) 2205, 2206. When an operator of the display device has designated the image 2202 displayed in the window 2204 by using an operating means, not shown, at least one piece of related information is displayed and certain processing based on that information is started up. If there are a plurality of pieces of related information, the operator can select one of these and starts up certain processing based on the selected related information.

Specifically, the one-touch window 2204 on the display screen 2201 acts as a special management area for guiding a specific operation using the images 2205, 2206 as a key (that is, an area corresponding to a display part of the management area described in the present invention). Using an image displayed in this management area as a key, the operator of the information display device can realize a new operation. If a mouse is provided as an operating means, a pop-up menu is caused to appear by clicking the right mouse button and related information is displayed there. If the related information includes a plurality of pieces of information, it is preferred to specify one of the pieces of related information by clicking the left mouse button.

An information provision window 2202 is a frame for displaying at least an image 2203 or the like. When the operator of the information display device has specified an image displayed in this frame by using an operating means, not shown, a new image is added and recorded to the one-touch window 2204 on the basis of that operation.

In this case, the image added to the one-touch window 2204 may be an image which is specified and displayed in the information provision window 2202, or may be replaced by another image, if necessary. In the information provision window 2202, character information 2207 may be displayed other than the image.

Specifically, the information provision window 2202 on the display screen 2201 acts as an information image presentation area which displays images to interest the operator of the terminal and which leads to the recording to the one-touch window 2204 as the operator of the terminal carries out an operation to specify an image.

With respect to the specifying operation by the operator of the information display device, when a pointing device such as a mouse is provided on the operating means, it is desired to use a so-called drag-and-drop user interface technique in which the user designates an image to be recorded by using the pointer and drags and drops the image on a one-touch frame 2202 (2208). Using this user interface is advantageous because an operational feeling similar to that of other Windows programs can be obtained when Internet Explorer or Netscape Navigator is used as the information provision window 2202.

(1.3.2. Another Exemplary Graphic Image Suitable for Computer)

Figure 23:
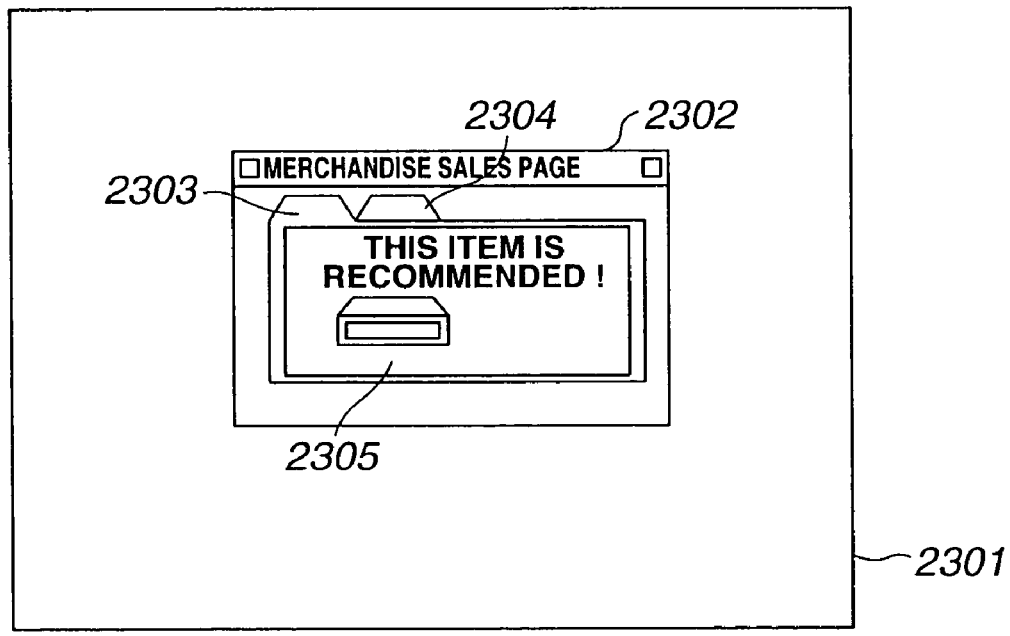
FIG. 23 shows an exemplary graphic image displayed at the client according to the present invention.
Figure 24:
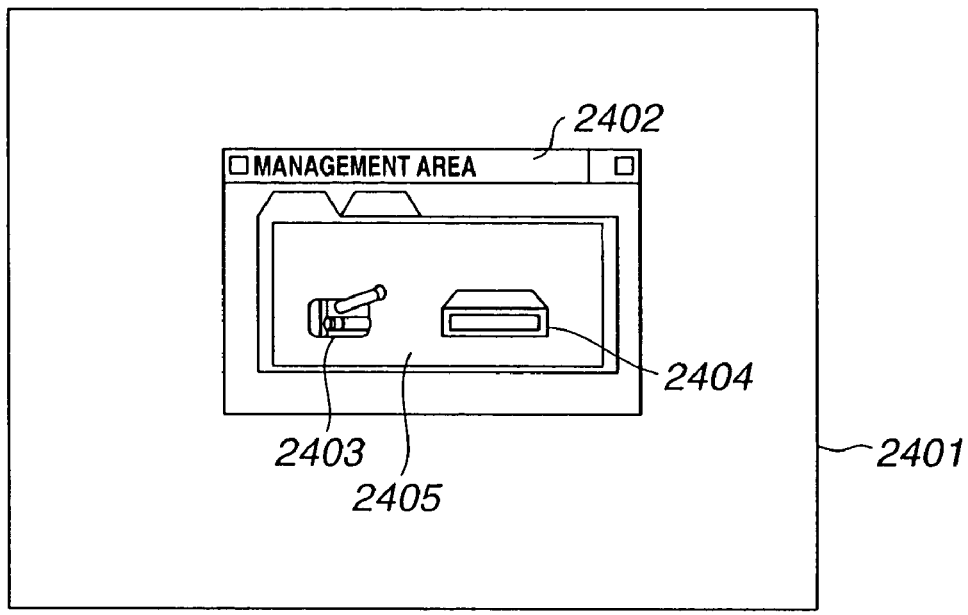
FIG. 24 shows an exemplary graphic image displayed at the client according to the present invention.

As another exemplary interface, windows as shown in FIGS. 23 and 24 can be used.

Display screens 2301, 2401 are, for example, cathode-ray tube display screens, TFT liquid crystal display screens, screens in display devices embedded in eyeglasses to be put on a human body, or the like. The display screens 2301, 2401 act so that a person can visually grasp information from the display device.

An information display/recording window 2302 functions as an interface which allows an operator to carry out an operation to display and record an image acquired from an information provider.

An information provision tab 2303 is an interface element for selecting a management area provided within the area of the information display/recording window 2302. When this tab is active, an image sent from the information provider can be displayed in a first management area 2305. When the operator of the terminal of the information display device has specified the image displayed in this area by using an operating means, not shown, a new image is added on the basis of that operation to a second management area which is displayed when a one-touch tab 2304 becomes active.

The one-touch tab 2304 is an interface element for selecting a management area provided within the area of the information display/recording window 2302. When this tab is active, a management area is displayed and a new image according to an image designated for recording in the information presentation area 2305 can be displayed in the management area 2405. When the operator of the information display device has specified the image displayed in the area by using an operating means, not shown, at least one piece of related information is displayed on the basis of that operation and certain processing based on the information is started up. If there are a plurality of pieces of related information, one of these pieces of related information can be selected and certain processing based on the selected related information can be started up. That is, the management area 2405 on the information display/recording window 2402 acts as an area for guiding a specific operation using images 2403, 2404 as a key. Using an image displayed in this area as a key, the operator of the terminal can realize a new operation.

Using this user interface is advantageous because the information display and recording operation can be completed in a small display area when the display screens 2301, 2401 have small areas or when the screens have low resolution.

(1.3.3. Another Exemplary Graphic Image Suitable for Digital Television or PDA)

Figure 25:
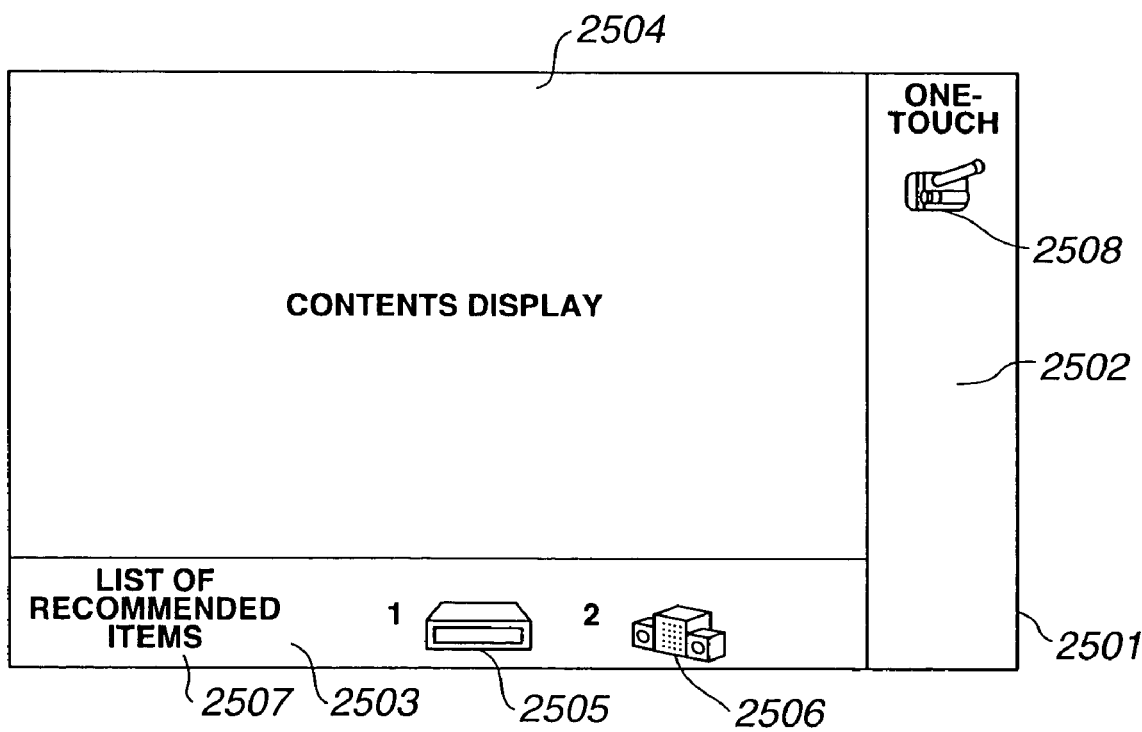
FIG. 25 shows an exemplary graphic image displayed at the client according to the present invention.

In the case where an information image is used on a digital television or a portable terminal such as PDA (personal digital assistance), it is preferred to employ look and feel as shown in FIG. 25, which will be described hereinafter.

A display screen 2501 is a cathode-ray tube display screen, a TFT liquid crystal display screen, a screen in an information display device embedded in eyeglasses to be put on a human body, or the like. The display screen 2501 acts so that a person can visually grasp information from the display/operation device. Again, though the boundary part of the display screen 2501 overlaps the outermost frame of the display device in FIG. 25, the frame may be displayed within the display device.

A one-touch frame 2502 is a frame which functions similarly to the one-touch window and displays at least an image 2508. When an operator of the display device has designated the image 2508 by using an operating means, not shown, at least one piece of related information is displayed and certain processing based on that information is started up. If there are a plurality of pieces of related information, the operator can select one of these and starts up certain processing based on the selected related information. Specifically, the one-touch frame 2502 on the display screen 2501 acts as a management area for guiding a specific operation using the image 2508 as a key. Using an image displayed in this management area as a key, the operator of the terminal can realize a new operation.

An information provision window 2503 is a frame which functions similarly to the above-described information provision window and displays at least images 2505, 2506 and the like. When the operator of the information display device has specified an image displayed in this frame 2503 by using an operating means, not shown, a new image is added to the one-touch frame 2502 on the basis of that operation.

In this case, the image added to the one-touch frame 2502 may be an image displayed in the information provision window 2503, or may be replaced by another image, if necessary. In the information provision window 2503, character information 2507 may be displayed other than the image.

Specifically, the information provision window 2503 on the display screen 2501 acts as a special area which displays images to interest the operator of the terminal and which leads to the recording to the one-touch frame 2502 as the operator of the terminal carries out an operation to specify an image.

With respect to the specifying operation by the operator of the display/operation device and the recording to the one-touch frame, when a pointing device such as a mouse is provided on the operating means, it is desired to use a so-called drag-and-drop user interface technique in which the user designates an image to be recorded by using the pointer and drags and drops the image on the one-touch frame 2502.

A contents display screen 2504 is a frame for displaying contents such as a movie in digital broadcast. The contents display screen 2504 is an area used for displaying information which the operator of the terminal wants to acquire. The contents are not limited to moving images but may include all the information that stimulates the human vision, such as still images and information of teletext broadcasting.

(1.4. Communication Between Information Provision Area and Management Area)

Communication of related information and the like is carried out between the information provision area and the management area. To realize this, inter-process or inter-thread communication is used. In general, various techniques can be selected for realizing inter-process or inter-thread communication. For example, a control unit for controlling the two areas can communicate using a common memory space and file. Alternatively, data communication can be carried out between the information provision area and the management area by preparing another process and establishing communication with the prepared process on the basis of the COM (Component Object Model) technique.

(2. Embodiments of the Present Invention)

(2.1. Structure of System According to First Embodiment of the Present Invention)

The overall structure of a system according to a first embodiment of the present invention will now be described with reference to FIG. 1.

Figure 1:
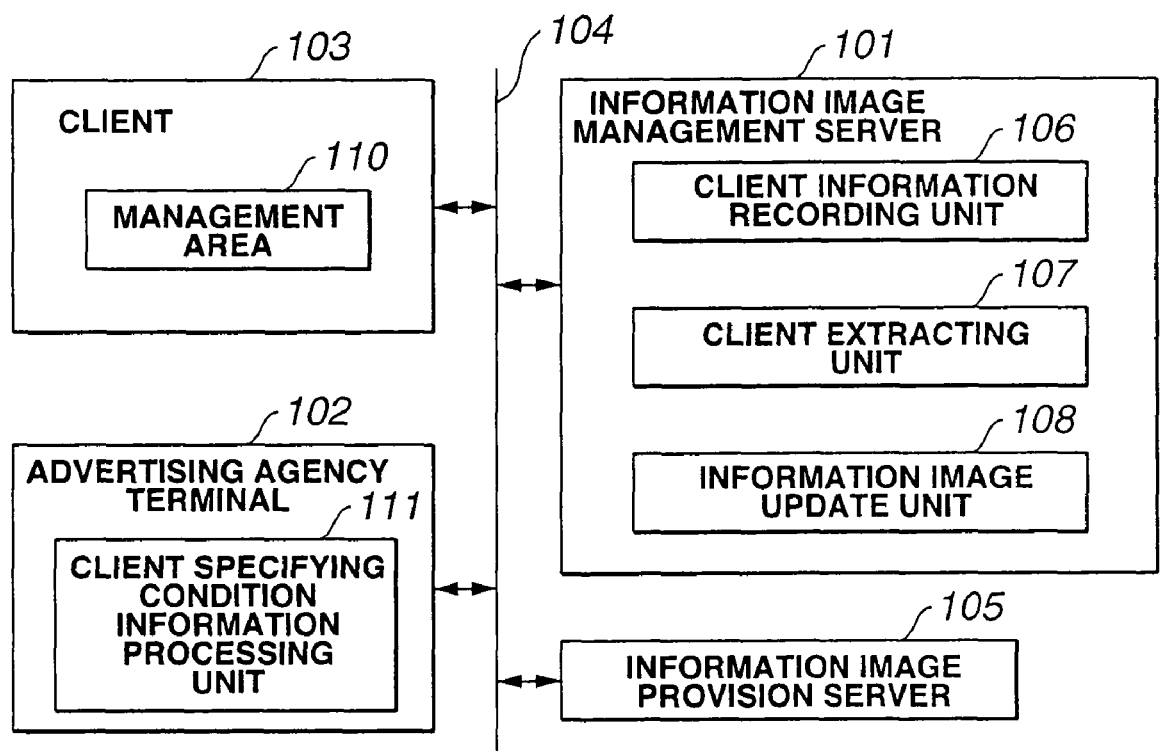
FIG. 1 shows the overall structure of an information providing system according to a first embodiment of the present invention.

A system shown in FIG. 1 is constituted by an information image management server 101, an advertising agency terminal 102 and a client computer 103, each of which is connected to a network 104 and thus operates. Although not essential to the present invention, an information image providing server 105 is connected to the network 104.

(2.1.1. Network)

The network 104 acts so that devices connected thereto through wired or wireless connection can transmit and receive information with each other when a session is established to the target device. Therefore, though the network 104 is shown as a single backbone line for connection in FIG. 1, a plurality of networks may be combined via a gateway to realize the network 104, like the Internet. Moreover, the devices need not be connected directly to the backbone line as a so-called backbone and may be temporarily connected by PPP as long as transmission and reception of information between the devices can be carried out when a session is established.

(2.1.2. Information Image Management Server)

Figure 3:
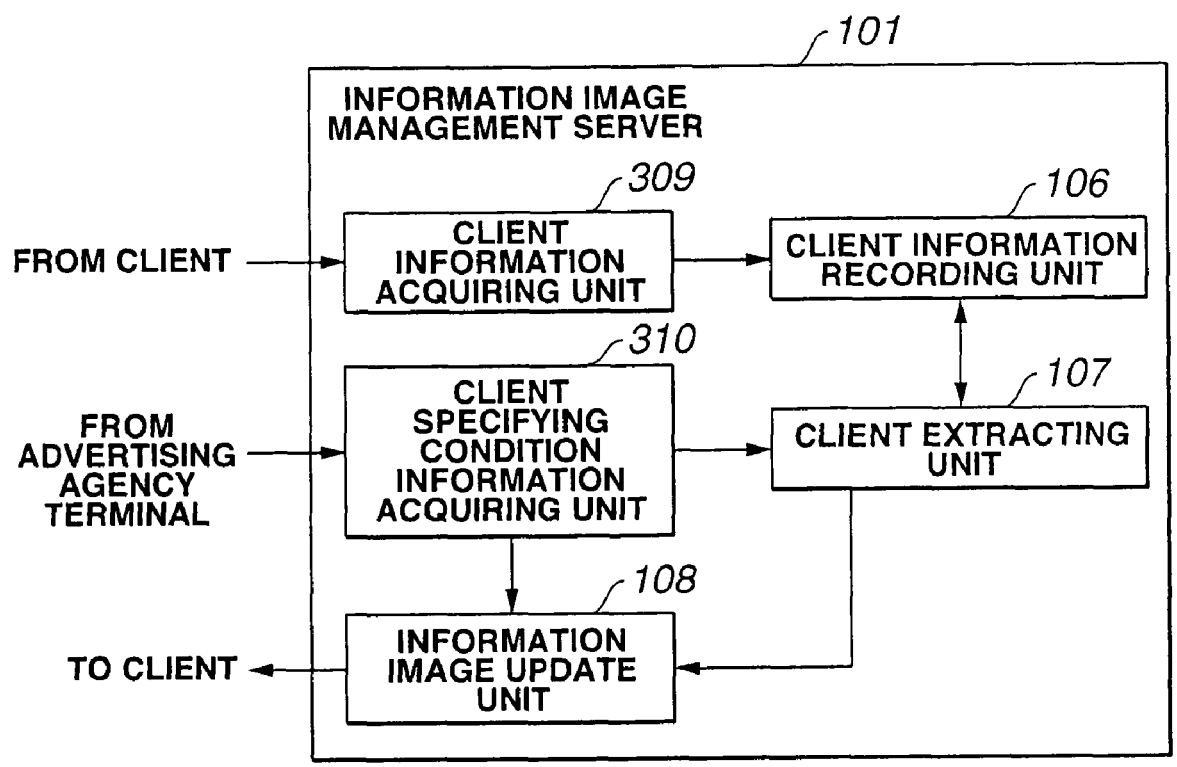
FIG. 3 shows an exemplary overall structure of an information image management server.

The information image management server 101 will now be described with reference to FIGS. 2 and 3. FIG. 2 shows an exemplary structure of a client information recording unit 106. FIG. 3 shows an exemplary overall structure of the information image management server 101.

The information image management server 101 is connected to the network 104 and includes a client information recording unit 106, a client extracting unit 107 and an information image update unit 108.

The structure of the client information recording unit 106 will be described with reference to FIG. 2.

The client information recording unit 106 communicates with the client computer 103 which is directly or indirectly connected to enable communication with the information image management server, and also communicates with the advertising agency terminal 102. The term "directly or indirectly" means that any of direct wired or wireless connection to the network 104, connection via a buffer and connection via a gateway as a network may be used as along as communication with each other is possible. The client computer 103 sends a notification of an information image recorded in a management area 110 of the client computer to the information image management server 101. In this case, the client information recording unit 106, on the basis of this notification, decides at least information which enables unique identification of the client computer (hereinafter referred to as client ID 201) and information image registration information, which is information related to an information image registered to the client computer, and records such information as one record. The number of pieces of registered image information included in one record can be increased or decreased in accordance with the number of information images registered to the client computer.

The information image registration information may include registered information image specifying information 202 and 203, which serve as information for specifying an information image, for example, file name of the information image, URL, or information image ID 204, 205, . . . uniquely allocated to the respective client computers, and may also include registration date and time 206, 207 and other information 208, 209, if necessary. Recording all such information as a single record is advantageous in taking various statistics.

The client extracting unit 107 will now be described.

The client extracting unit 107, functioning as a database management system (DBMS), can grasp which information image is registered to the management area of the client computer, by making an inquiry using the client ID 201 as a key from another device such as the advertising agency terminal 102. Moreover, by making an inquiry using the registered information image specifying information, the client extracting unit 107 can grasp which client computer has the information image registered thereto.

The information image update unit 108 will now be described.

The information image update unit 108 can update a specific information image held by a specific client to another information image or can add another new information image (hereinafter referred to as information image update/addition processing).

The client to be a target of the information image update/addition processing is decided on the basis of the information (for example, client ID) specifying the client extracted by the client extracting unit 107. The information image update unit 108 sends information related to another information image or another new information image (hereinafter referred to as update/addition contents information) to the client computers decided on the basis of the information specifying the client computers, and sends out to each of these clients a request to update or add recording on the basis of the above-described another information image or another new information image. The update/addition contents information may be all or a part of the image information or related information. Alternatively, it is possible to send only the information (for example, URL) of the place where such information is stored. An example of the place where such information is recorded may be the information image providing server 105 or any device connected to the network 104, such as the advertising agency terminal 102.

A client information acquiring unit 309 will be described hereinafter.

The client information acquiring unit 309 has a function to acquire the information which enables unique identification of the client computer and the information image registration information, sent thereto from each client computer, and to send the information to the client information recording unit 106. Having received the information, the client information recording unit 106 records the information in association with the client ID 201.

A client specifying condition information acquiring unit 310 will be described hereinafter.

The client specifying condition information acquiring unit 310 has a function to receive the client specifying condition information transmitted from the advertising agency terminal 102 and to send it to the client extracting unit 107. The client specifying condition information includes a condition for allowing the client extracting unit to extract a client, for example, an extraction condition such that information images A and B are recorded while an information image C is not recorded.

The client specifying condition information may also include the update/addition contents information. In this case, the client specifying condition information acquiring unit 310 sends the update/addition contents information to the information image update unit 108.

The client information acquiring unit, the client specifying condition information acquiring unit and the information image update unit set up sessions with the client computers and the advertising agency terminal to transmit and receive information. The preparation of a session when using Windows as the OS is described in detail at the MSDN site of Microsoft Corporation, particularly at (2.1.3. Client Computer)

The client computer 103 is an information processing device such as a personal computer, digital television, mobile telephone, PDA (personal digital assistance) or the like connected to the network 104. The connection mode may be direct wired connection or wireless connection. As described above, the functions of the management area 110 are generated within the client computer 103. In general, these functions are realized by a program.

(2.1.3.1. Exemplary Structure of Client Computer)

The client computer 103 will be described in detail with reference to FIG. 4.

An image display unit 401 is, for example, Internet Explorer of Microsoft Corporation. When an operator has given an instruction to download information from a specific server, the image display unit 401, on the basis of the instruction, makes a logical connection to the information image providing server 105 via the network, acquires the information and displays it in an information presentation area 402.

The management area 110 is constituted by, for example, an information image recording unit 403, an information image recording notifying unit 404, an information image update executive unit 405, a related information acquiring unit 406, an image display constituting unit 407, an image specifying unit 408, and an operation decision unit 409.

The client computer 103 further has an OS interface 410, which functions as an interface for the management area 110 to transmit and receive information to and from the information image management server 101 and the information image providing server 105. The OS interface 410 has, for example, a communication COM 411.

The communication COM 411 is a means for realizing communication between processes (or threads, throughout the following description) using the Component Object Model, which is the function of the OS. For example, when a user interface operation such as drag-and-drop is carried out, transmission of information from a process where the information is dragged to a process where the information is dropped is realized. The COM is described in detail at the following site of Microsoft Corporation:

The information image recording unit 403 records an information image which is sent from the communication COM 411 or the information image update executive unit 405 and which contains image information and related information packaged to be handled in one unit. The image information and the related information may be recorded in separate memories while these are still associated with each other, instead of recording the image information and the related information as an information image.

When an operation to register an information image is carried out by a drag-and-drop operation from the information presentation area 402 to the management area 110, or when an operation to update/add an information image is carried out by the information image update executive unit 405 which has received a predetermined instruction from the information image management server, the information image recording unit 403 sends a notification to the effect that the information image is registered to the management area, to the information image management server 101 via the information image recording notifying unit 404.

The related information acquiring unit 406 is connected to the information image recording unit 403 and acquires only the related information from the information image recorded in the information image recording unit 403.

The information display constituting unit 407 is connected to the information image recording unit 403 and displays all or selected ones of the information images recorded in the information image recording unit 403, as a display from the management area 110. That is, the operator is enabled to perceive an image according to the information image through the one-touch frame or the one-touch window.

When the operator has specified an image displayed in the management area by using the function of the OS interface 410, the image specifying unit 408 specifies an information image corresponding to that image.

The operation decision unit 409 is connected to the image specifying unit 408 and to the related information acquiring unit 406 and executes an operation based on the related information in the information image specified by the operator. For example, if the related information is a link to the URL of the web page, the operation decision unit 409 functions to execute jump to that URL or to request the browser to execute jump.

(2.1.3.2. Exemplary Operation of Client)

Figure 4:
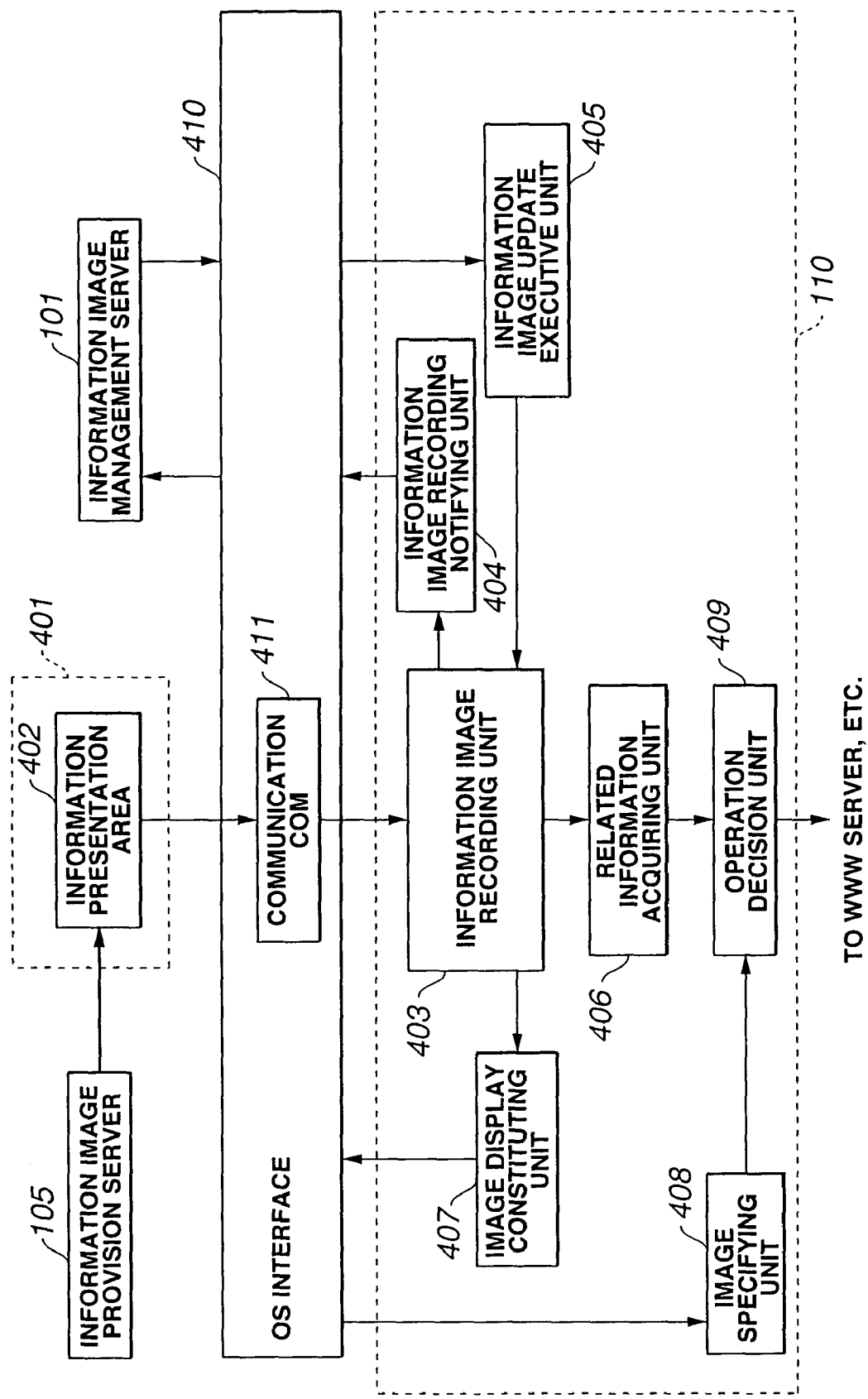
FIG. 4 shows an exemplary structure of a client computer.

The operation in the case where the client is constituted as shown in FIG. 4 will now be described.

The operator of the client acquires page information including information images from the information image providing server 105 and causes the page information to be displayed in the information presentation area 402 of the image display unit 401. In this case, if Internet Explorer is used as the image display unit, an operation to display a web page of the server in accordance with the HTTP (HyperText Transfer Protocol) is carried out.

When the operator of the client views the image displayed in the information presentation area 402 and decides an image to be recorded into the management area 110, an operation to shift this image to the management area 110 by a drag-and-drop operation is carried out. In this case, since the image to be dragged and dropped is an information image, it is to be recorded into the information image recording unit 403 through the communication COM 411. Along with this, a notification to the effect that the information image is registered to the management area 110 is sent to the information image management server 101 through the information image recording notifying unit 404.

The registration of the information image to the management area may also be carried out without registering from the information presentation area 402, as the information image update executive unit 405 executes update/addition of the recording contents of the information image recording unit 403 in accordance with a message of information image update/addition processing sent from the information image management server 101. In this case, too, a notification to the effect that the information image is registered to the management area 110 is sent to the information image management server 101 through the information image recording notifying unit 404.

By carrying out such an operation, the information image management server 101 can constantly correctly record which client computer has what information image registered thereto.

Meanwhile, the information image recorded in the information image recording unit 403 of the management area 110 is displayed to the operator of the client computer via the OS interface 410 by the action of the image display constituting unit 407. When the operator of the client carries out an operation based on the related information recorded in the displayed information image, an operation related to the related information is carried out by the actions of the image specifying unit 408 and the operation decision unit 409. For example, if the URL of another information image providing server is included as the related information, the page of this URL is displayed to prompt download of another information image.

On the other hand, if an instruction to update/add an information image to be displayed in the management area 110 is given from the information image management server 101, a notification is sent to the information image update executive unit 405 together with the information image to be updated/added or information (for example, the URL) indicating the place where the information image is recorded. The information image update executive unit 405 carries out addition or update of the information image recorded in the information image recording unit 403, using the received information image. If the information indicating the place where the information image is recorded is provided, the information image update executive unit 405 acquires the data of the information image in accordance with that information and carries out addition or update of the information image recorded in the information image recording unit 403, using the data.

(2.1.4. Advertising Agency Terminal)

The advertising agency terminal 102 is connected to the network 104 and has a function to communicate with other device via the network. The advertising agency terminal 102 is an information processing device such as a personal computer, digital television, mobile telephone, PDA (personal digital assistance) or the like. The connection mode may be direct wired connection or wireless connection. For example, if the information processing device has Windows (registered trademark) of Microsoft Corporation loaded thereon as its operating system, it is desired that so-called browser software is loaded such as Internet Explorer (registered trademark) of Microsoft Corporation or Netscape Navigator (registered trademark), Netscape Communications Corporation or the like.

The reason for using the term "advertising agency terminal" is that in most cases, a distributor of information images is an advertising agency requested by an advertiser. Therefore, an advertising agency terminal is not limited to a terminal equipment used at an advertising agency. An "advertising agency terminal" means an information terminal equipment operated by a person who wants to distribute an information image, including an advertising agent.

The advertising agency terminal 102 has a client specifying condition information processing unit 111 having a function to send the information image management server 101 a notification of client specifying conditions for selecting clients to which the information image is to be distributed.

Figure 5:
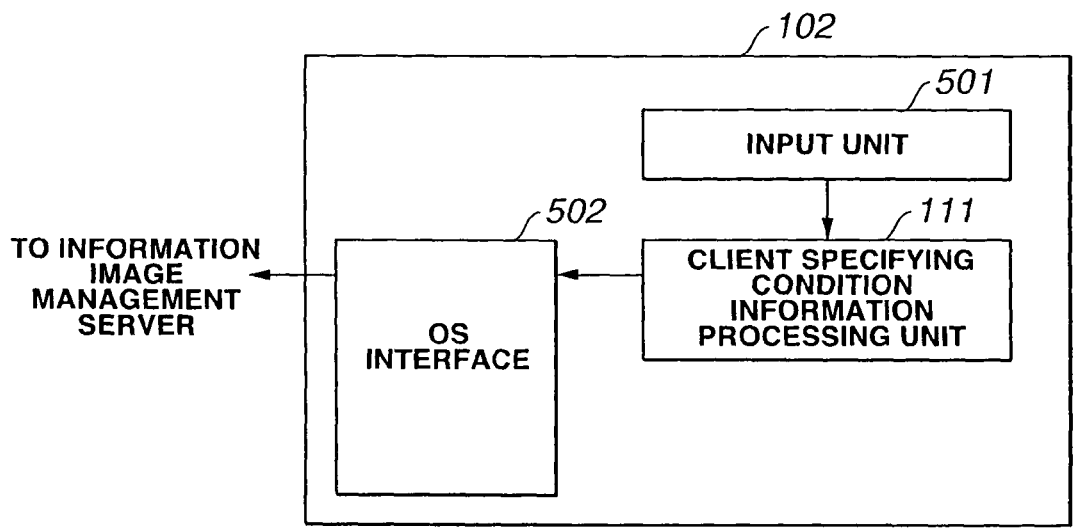
FIG. 5 shows an exemplary structure of an advertising agency terminal.

FIG. 5 shows an exemplary structure of the advertising agency terminal 102. The advertising agency terminal 102 has the client specifying condition information processing unit 111, an input unit 501, and OS interface 502.

The OS interface 502 has a communication interface function for the advertising agency terminal 102 to transmit and receive information to and from the information image management server 101, and a user interface function to input and output information between the operator of the terminal 102, and the information image management server 101 and the client specifying condition information processing unit 111.

The input unit 501 is a means having a function to convert desired client specifying condition information inputted by the operator into data and to send the data to the client specifying condition information processing unit 111. The input unit 501 is, for example, a keyboard, pointing device, speech input system or the like. The operator uses the input unit 501 to input what information image is to be distributed to which client computer.

It is preferred that the form of distribution of information images can be arbitrarily set in accordance with the request from the operator of the advertising agency terminal. For example, it is preferred that the operator can freely designate the distribution form in accordance with the marketing strategy or the like, for example, handling only the image information constituting a certain information image A as different image information, replacing all or a part of the related information constituting a certain information image A with different related information, adding new related information to the related information constituting a certain information image A, replacing a certain information image A with a totally different information image A', or adding one or more information images which are not registered by the client computer.

On receiving the client specifying condition information in the form of data from the input unit 501, the client specifying condition information processing unit 111 configures the information in a data format that can be transmitted to the information image management server 101. As the conditions for selecting clients, the client specifying condition information includes information for specifying what information image is held or not held by the client computer, and also includes information about what information image is to be distributed. For example, the client specifying condition information is described by a combination of information image ID from the input unit and a logical operator such as "AND," "OR," "NOT" or "EXOR." The client specifying condition information also includes information about an information image to be distributed. For example, the client specifying condition information may include data of a new information image to be added or the URL of the place where it is recorded. Moreover, the client specifying condition information may include information specifying an information image to be updated, for example, information image ID and information about update contents such as related information to be replaced.

The client specifying condition information processing unit 111 generates data by converting such client specifying condition information into data and sends the data to the OS interface 502. Then, OS interface functions to set up connection with the information image management server and then send the client specifying condition information in the form of data to the information image management server in accordance with a predetermined communication protocol.

(2.1.5. Information Image Providing Server)

The information image providing server 105 is connected to the network 104. When an information image providing request is sent thereto via the network, for example, when an information image is embedded in a certain web page and a certain client is requesting for display of the web page, the information image providing server 105 sends the recorded information image to the requesting party in response to the request. Particularly when an information image is recorded therein and a request for provision of this information image is sent thereto via the network, the information image providing server 105 provides this information image to the requesting party.

The information image providing server 105 is not necessarily required in the embodiment of the present invention. If the operator of the client newly starts using the management area, it is normally considered that no information image is registered. In such a case, the management area of the client requests the providing server to present available information images. In response to this request, the management server 101 sends the client a web page presenting a plurality of information images registered to the management server and thus prompts the operator of the client computer to acquire a desired information image. Thus, it will contribute to the distribution of information images according to the present invention.

2.2. Operation of System According to First Embodiment of the Present Invention

Figure 7:
FIG. 7 shows an exemplary client extraction condition input screen displayed at the advertising agency terminal.
Figure 8:
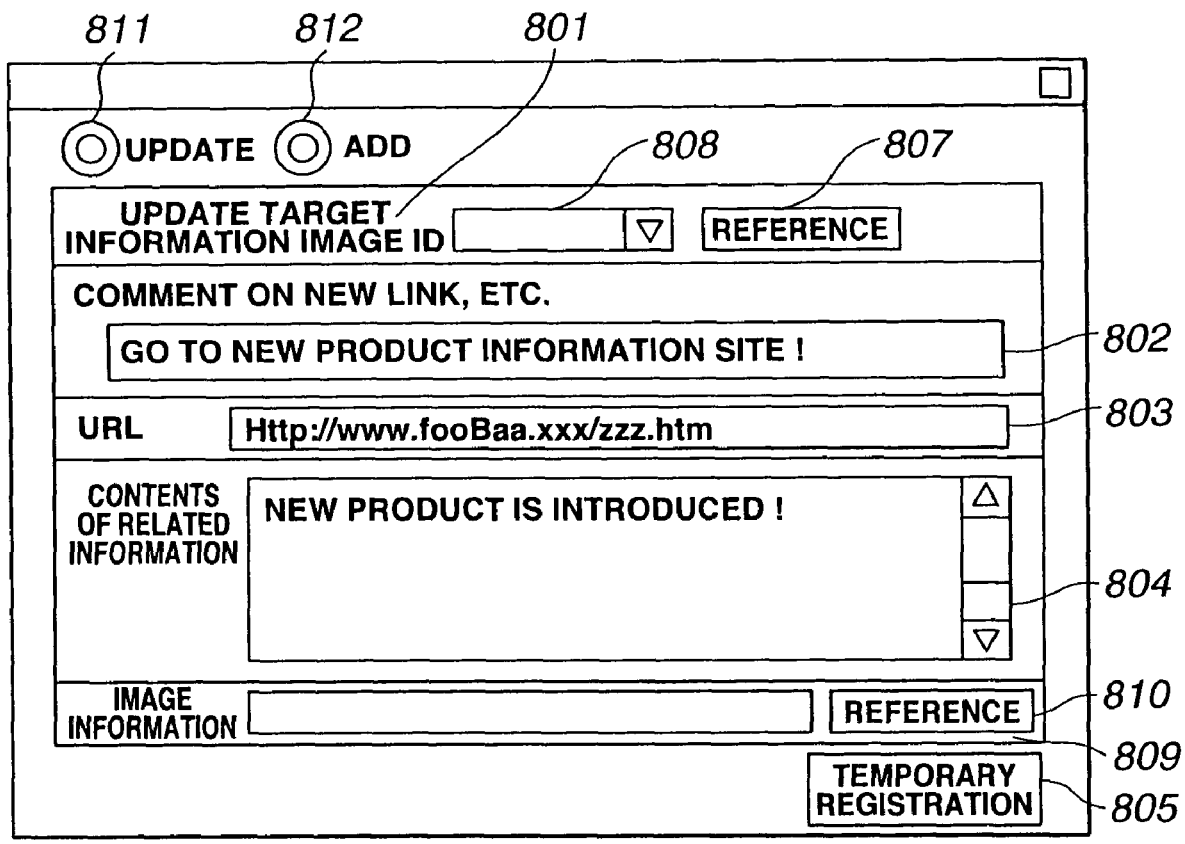
FIG. 8 shows an exemplary client extraction condition input screen displayed at the advertising agency terminal.
Figure 9:
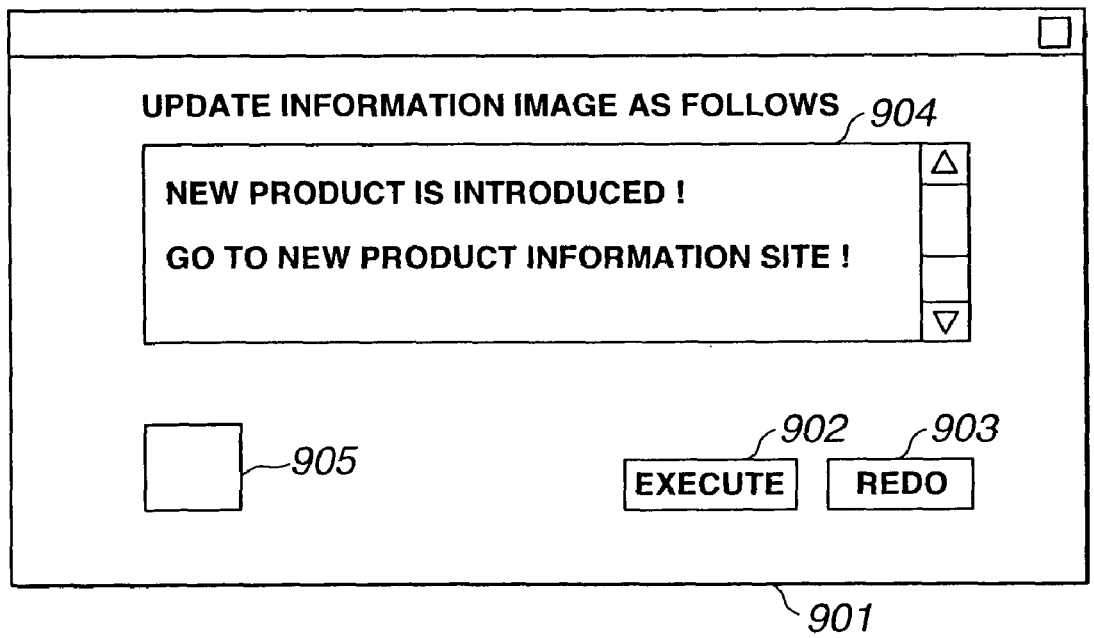
FIG. 9 shows an exemplary client extraction condition input screen displayed at the advertising agency terminal.

The operation of the system described in the first embodiment of the present invention will now be described with reference to FIG. 6. In the following description, FIGS. 7, 8 and 9 are supplementally used.

Figure 6:
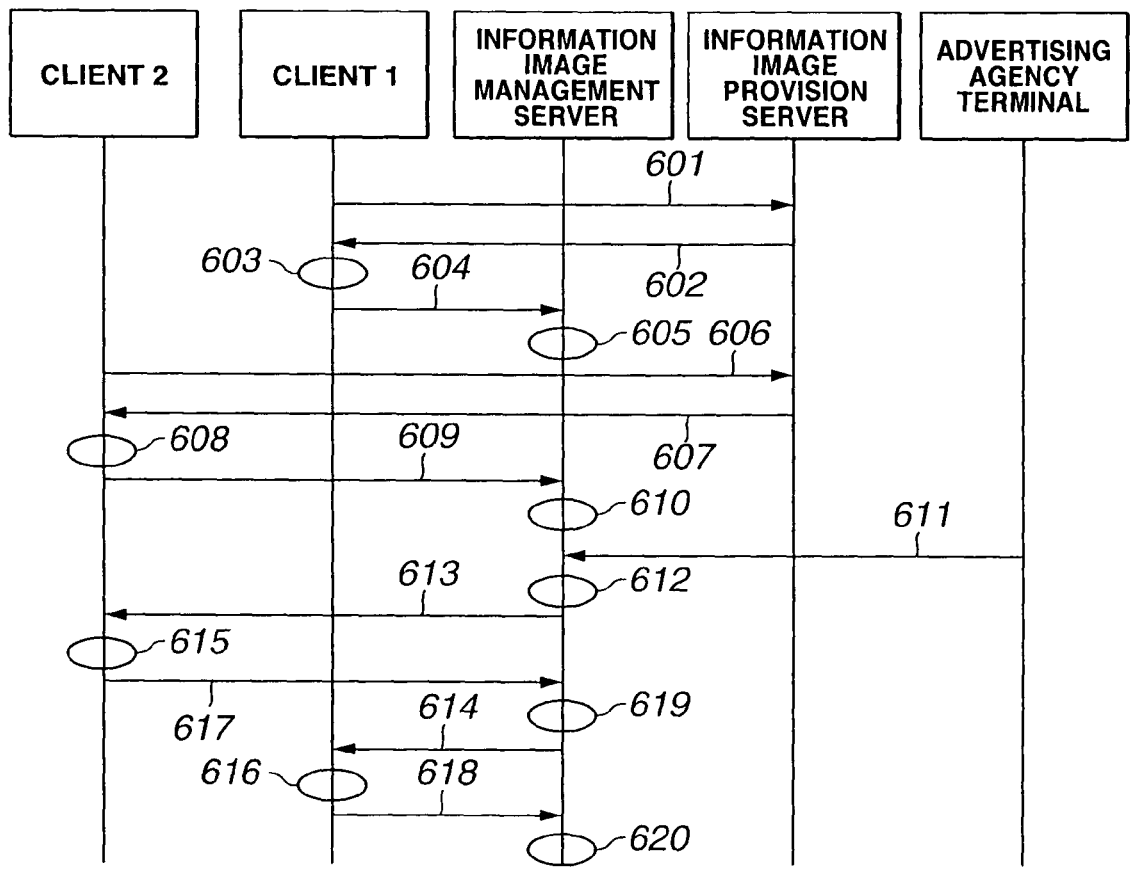
FIG. 6 shows the operation of the information providing system according to the first embodiment.

Although "client computer 1" and "client computer 2" are shown as client computers in FIG. 6, the present embodiment is not limited to the two clients, which are simply examples of a plurality of clients.

FIG. 6 shows a scenario in the case where the system of the present embodiment operates. In this scenario, after an information image is taken in and registered to a client computer from the information image providing server, the operator of the advertising agency terminal executes update or addition of an information image and this update or addition is reflected on the client computer. FIGS. 7, 8 and 9 show a series of exemplary input screens presented by the advertising agency terminal to the operator for preparing the client specifying condition information to be sent to the information image management server.

Referring again to FIG. 6, first, the client computer 1 accesses the information image providing server and requests for a web page containing an information image (601). Then, in response to this request, the information image providing server transmits a web page containing a certain information image (hereinafter referred to as "information image X") to the client computer 1 (602). The client computer 1 displays, in the information image presentation area, the information image transmitted from the information image providing server. The operator carries out a predetermined operation such as drag-and-drop on the displayed information image and registers it to the management area. Thus, the information image X is recorded in the information image recording unit of the management area (603). The client computer 1 also sends a notification of the registered information image to the information image management server (604). Having received the notification, the information image management server records, in its client information recording unit, the client ID of the client computer 1 in association with the information image ID of the information image X (605).

Similarly, the client computer 2 acquires the information image X from the information image providing server and registers it to the management area. Specifically, the client 2 accesses the information image providing server and requests for a web page containing the information image X (606). Then, in response to this request, the information image providing server transmits a web page containing the information image X to the client 2 (607). The client computer 2 displays, in the information image presentation area, the information image transmitted from the information image providing server. The operator carries out a predetermined operation such as drag-and-drop on the displayed information image and registers it to the management area. Thus, the information image X is recorded in the information image recording unit of the management area (608). The client computer 2 also sends a notification of the registered information image to the information image management server (609). Having received the notification, the information image management server records, in its client information recording unit, the client ID of the client 2 in association with the information image ID of the information image X (610).

Next, as the advertising agency terminal 102 accesses the information image management server 101 and establishes a connection thereto, the client specifying condition information is sent from the advertising agency terminal 102 to the information image management server 101 (611).

FIG. 7 shows an exemplary input screen used when the operator at the advertising agency terminal generates the client specifying condition information.

First, the ID number or the like for specifying the advertising agency is inputted to an input box 701 for inputting the advertising agency ID. This can be used for identification and accounting.

Then, the client extraction conditions such as which information image is held and which information image is not held are inputted. In this exemplary input screen, the information image ID or file name is inputted to an input box 702. The operator may press the scroll button so that the information image ID or file name is displayed, and the operator may select the information image ID or file name. When the information image ID or file name is selected, the corresponding information image is displayed in an information image display area 703. This enables the operator to easily confirm which information image has been selected. Moreover, a logical operator selection area 704 is provided, enabling extraction of a client based on various conditions.

In accordance with the client extraction conditions, two or more information images can be selected. With respect to the second information image, too, an information image ID or file name input box 705, an information image display area 706 and a logical operator selection area 707 are provided so that conditions for a combination of various information images can be set. The same applies to the third and subsequent information images.

If further processing is to be continued after the end of the input of the client extraction conditions as described above, a button 708 may be pressed to shift to the next input screen. If no further processing is desired, a cancel button 709 may be pressed to stop the client extraction condition input processing.

The layout shown in FIG. 8 is that of an exemplary input screen for an information image to be updated or added, which is displayed by pressing the button 708. In this screen, the operator first designates update or addition of an information image by selecting one of the corresponding buttons 811, 812. If the button 811 corresponding to the update is selected, an update target information image ID input section 801 is used for inputting an identifier 808 in order to decide which information image is to be updated. For example, if the information image X is updated to a new information image X', the information image ID of the information image X is inputted. Meanwhile, since the information image providing server 105 can identify the advertising agency terminal 102 through a mechanism such as a cookie, an information image which is already registered by the advertising agency can be specified. Therefore, in the case of transmitting HTML information according to the present form, a reference button 807 for updating a registered information image is provided. If the reference button is pressed, a list of information images already prepared at the information image generation server is displayed on an information image ID display section 804 and the identifier of an information image is decided by selecting the information image.

On the other hand, if the button 812 corresponding to the addition is selected, no input to the information image ID input section 801 is necessary.

This form also includes a text box for inputting a comment 802 about a new link or the like. The text inputted here is specified in the management area 110 of the client computer, as a text to be displayed as related information for causing a specific operation.

This form also includes a text box 803 indicating the URL. The URL described in this text box corresponds to the related information for causing the specific operation. If the related information specified by the operator in the management area 110 of the client is related to the comment 802, the URL operates so that the information image presentation area of the client accesses the URL designated by the text box 803.

Moreover, related information 804 contained in the update target information image is displayed in this form. Specifically, if the update of the information image is to be carried out by using the reference button in the information image ID input section 801, the related information held by the information image is displayed. Therefore, if a new preparation button is pressed, nothing is displayed in this part because no related information has been registered yet. The displayed related information can be text-edited and can be easily modified.

Furthermore, an image information specifying section 809 is provided in this form. When updating or newly preparing an information image, image information constituting an updated information image or an information image to be added is specified from this image information specifying section 809. Therefore, a reference button 810 is provided so that image information recorded at the advertising agency terminal 102 or the like can be specified.

As a temporary registration button 805 is pressed on completion of the input of the form, the advertising agency terminal 102 constitutes a page for confirming the information contents from the provided information and displays the page.

FIG. 9 shows an example of this page for confirmation. The page sent for confirmation includes an area 904 for displaying related information, and an area 905 for displaying an image to be displayed in the management area 110 of the client computer, so that the related information and the image can be confirmed. If the operator of the advertising agency terminal 102 decides the completion of the input as a result of the confirmation, the confirmation is completed by pressing an execution button 902. If the operator wants to redo the input, the operator can go back to the previous processing by pressing a redo button 903.

If the execution button 902 is pressed, the advertising agency terminal 102 established a connection with the information management server 101 and then transmits the client specifying condition information thereto (step 611).

Having received the client specifying condition information, the information image management server 101 processes the client specifying condition information (612). Specifically, in the information image management server 101, the client extracting unit 107 extracts, on the basis of the information, client ID which meets the conditions from the client information recording unit 106 and sends the extracted client ID to the information image update unit 108. Meanwhile, the client specifying condition information acquiring unit 310 extracts data of an information image to be updated or added, from the client specifying condition information, and sends it to the information image update unit 108. Having received the extracted client ID and data, the information image update unit 108 sends update/addition contents information to the client computers corresponding to the extracted client ID and transmits to each of the client computers a request for updating or adding contents in the information image recording unit 403 on the basis of the update/addition contents information (613, 614). The update/addition contents information may be all or a part of the image information or related information. Alternatively, it is also possible to transmit only the information about the place where the image information and related information are stored (for example, URL).

In this example, if the client extraction condition is that "the client has an information image X registered thereto," the information image management server 101 sends the above-described request to both the client computer 1 and the client computer 2.

This request may be sent separately to the individual client computers or may be sent by using a multicast IP address group described in an RFC (request for comments) 1112.

The generation of the information image need not be carried out at the advertising agency terminal 102. The advertising agency terminal 102 may send data about the related information and data about the image information to the information image management server 101 and the information image management server 101 may constitute the information image using these data.

Having received the request, the client computer rewrites the contents in the information image recording unit 403 in accordance with the contents of the request (615, 616). The updated information image or added information image is displayed as an image in the management area 110 by the image display constituting unit 407 and the OS interface 410. The operator of the client can browse the related information of the information image. Using the related information as a medium, the operator of the advertising agency terminal can distribute desired information, for example, advertising information, only a desired client computer.

Through this recording operation, the management area sends the information image management server 101 a notification that a new information image is recorded (617, 618). As this notification is sent, the information image management server 101 records the recording of the new information image to the database contained in the client information recording unit 106 (619, 620). By this operation, the information image management server 101 can constantly grasp the information image registered to each client computer.

(2.3. Advantage of First Embodiment)

According to the present embodiment, since an information image can be distributed selectively only to a specific client computer from the advertising agency terminal, it is possible to quickly improve the result of information distribution, particularly, the cost-effectiveness of distribution of advertising information.

(3. Second Embodiment)

A second embodiment of the present invention will now be described.

The second embodiment is different from the first embodiment in that when client specifying condition information is sent from the advertising agency terminal 102 to the information image management server 101, the information image management server 101 sends information about a client extracted on the basis of the client specifying condition information to the advertising agency terminal 102 before sending update/addition contents information to a target client computer.

(3.1. Structure of Second Embodiment)

While the overall structure of the system in the second embodiment is similar to the overall structure of the system shown in FIG. 1, the structures of the advertising agency terminal 102 and the information image management server 101 are different from those in the first embodiment.

Figure 10:
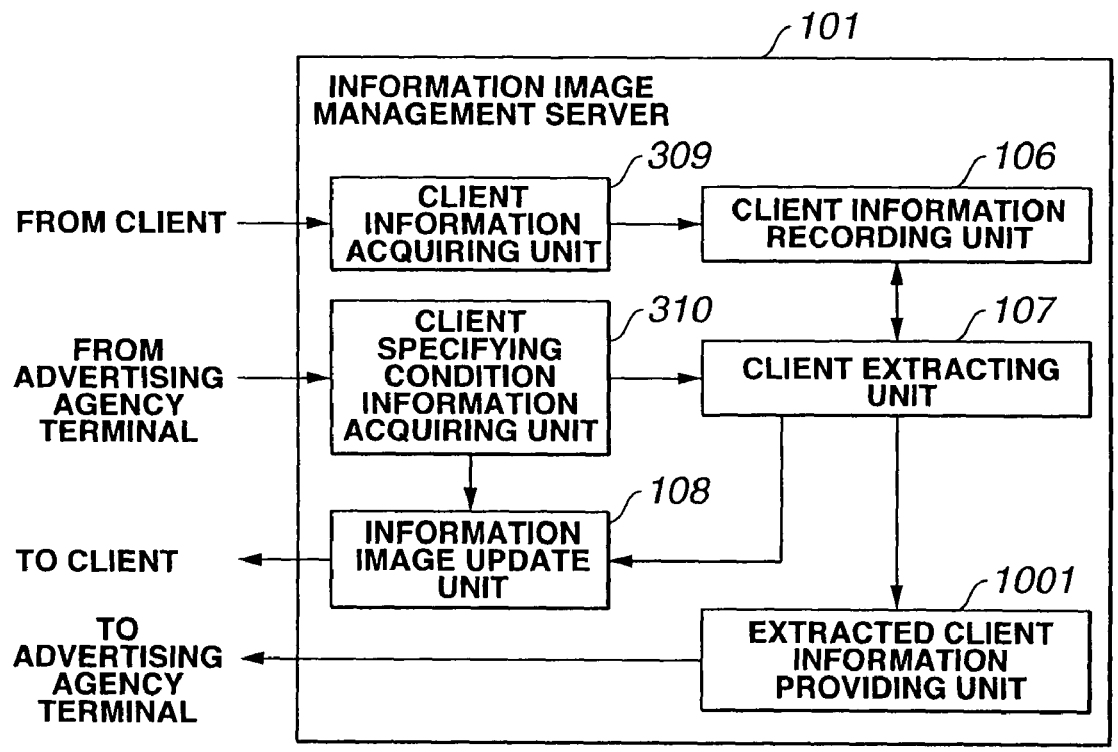
FIG. 10 shows an exemplary structure of an information image management server according to a second embodiment of the present invention.

FIG. 10 shows an exemplary structure of the information image management server 101 of the second embodiment. The structure of the information image management server 101 of the present embodiment is different from that of the information image management server 101 of the first embodiment, in that the information image management server 101 of the present embodiment has an extracted client information providing unit 1001 which receives information about a client computer extracted by a client extracting unit and sends it to the advertising agency terminal 102. The other parts of the structure are the same as those of the information image management server 101 of the first embodiment shown in FIG. 3 and therefore the same constituent elements in FIG. 10 are denoted by the reference numerals used in FIG. 3.

Figure 11:
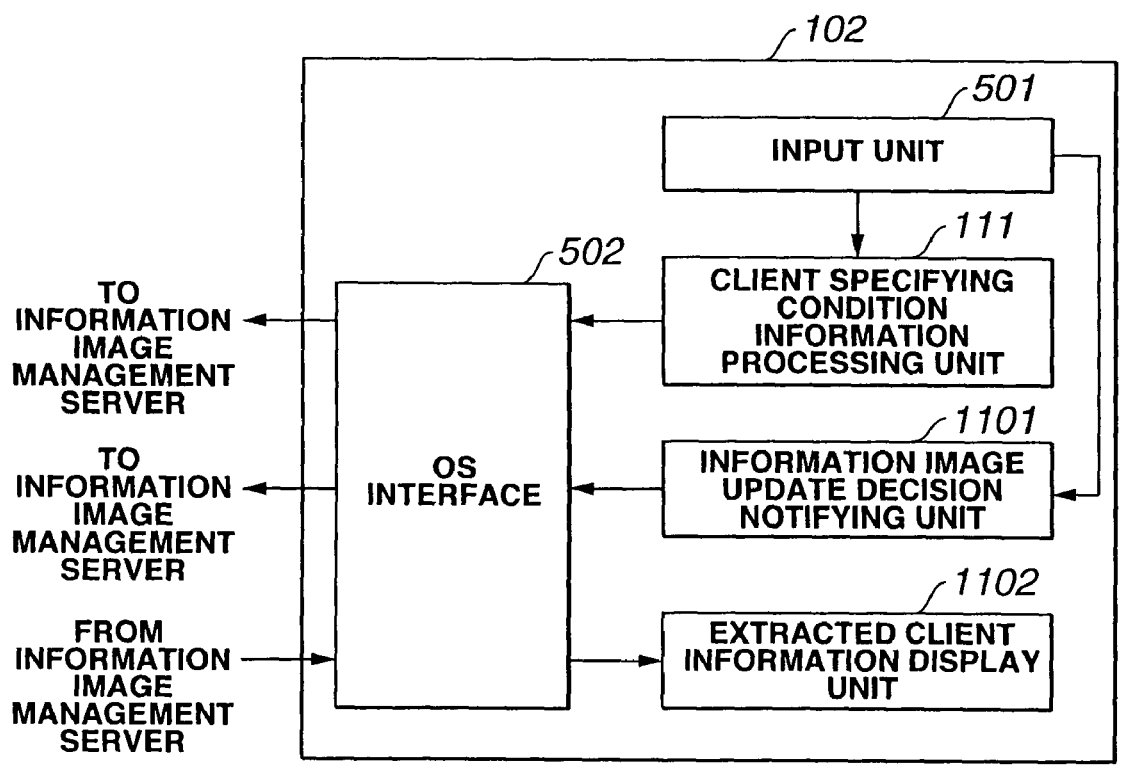
FIG. 11 shows an exemplary structure of an advertising agency terminal in the second embodiment of the present invention.

FIG. 11 shows an exemplary structure of the advertising agency terminal 102 of the second embodiment. The structure of the advertising agency terminal 102 of the present embodiment is different from that of the advertising agency terminal 102 of the first embodiment, in that the advertising agency terminal 102 of the present embodiment has an information image update decision notifying unit 1101 which generates an information image update decision notification signal when a predetermined operation such as pressing of an update execution button is carried out and sends the information image update decision notification signal to the information image management server 101 via an OS interface 502, and an extracted client information display unit 1102 which receives the information about the extracted client computer sent from the information image management server via the OS interface 502 and displays it to the operator in a recognizable manner. The other parts of the structure are the same as those of the advertising agency terminal 102 of the first embodiment shown in FIG. 5 and therefore the same constituent elements in FIG. 11 are denoted by the reference numerals used in FIG. 5.

(3.2. Operation in Second Embodiment)

The operation of the above-described system of the second embodiment will now be described with reference to FIG. 12.

Figures 12, 13:
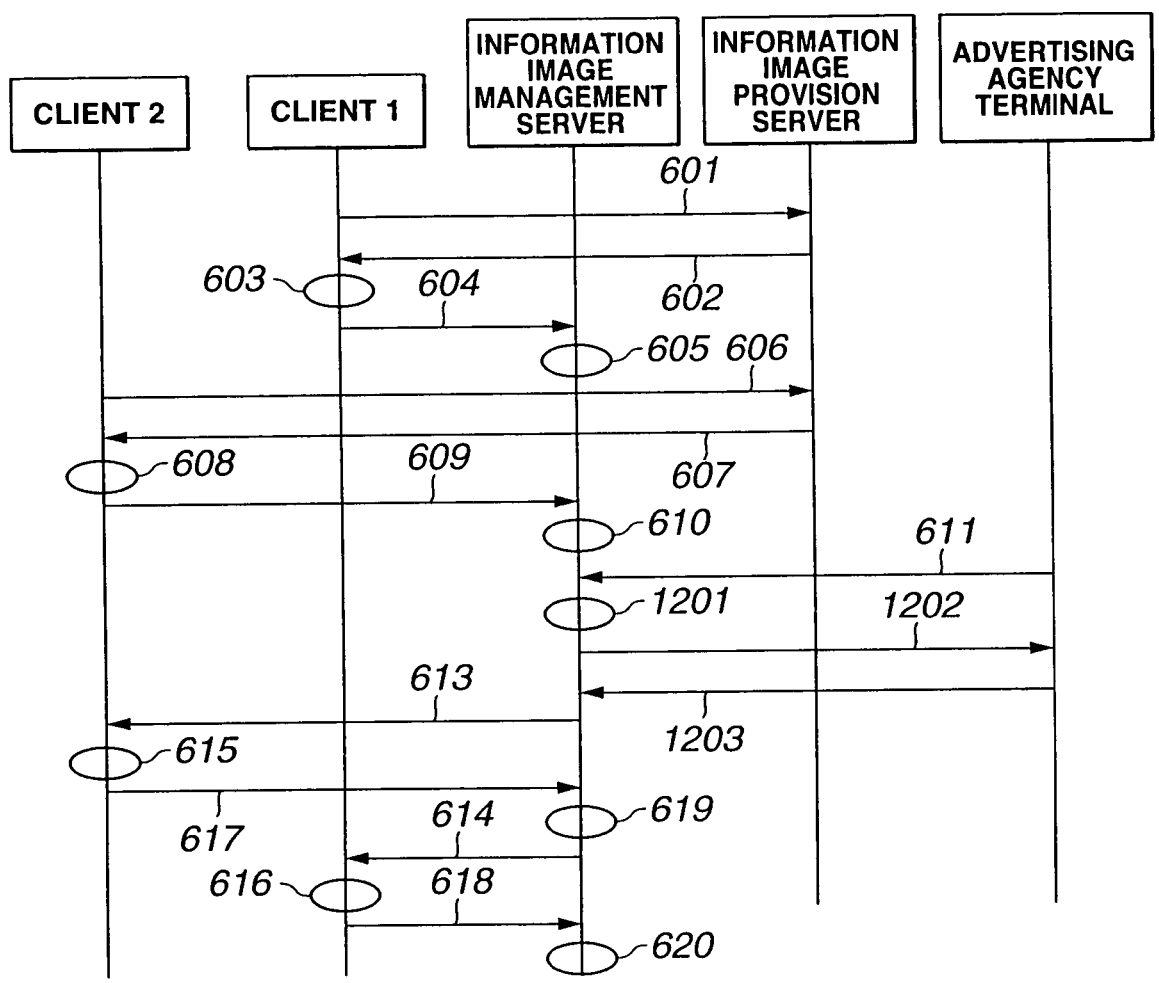
FIG. 12 shows the operation of an information providing system according to the second embodiment of the present invention.
FIG. 13 shows an exemplary display screen for the advertising agency terminal to display information related to an extracted client computer, to an operator.

In the following description, FIG. 13 is used supplementally. FIG. 12 shows a scenario in the case where the system of the present embodiment operates. FIG. 13 shows an exemplary display screen for the advertising agency terminal to present to the operator the information about the extracted client sent from the information image management server.

In the present embodiment, the operations at each client computer to acquire an information image from the information image providing server 105 or the like, register the information image and send a notification of the registered information image to the information image management server 101, and the operation at the information image management server 101 to register client information on the basis of the notification (601 to 605, 606 to 610) are similar to the operations in the first embodiment shown in FIG. 6.

Next, as the advertising agency terminal 102 accesses the information image management server 101 and sets up a connection thereto, the client specifying condition information is sent from the advertising agency terminal 102 to the information image management server 101 (611). Again, this operation is similar to the operation in the first embodiment shown in FIG. 6.

Having received the client specifying condition information, the information image management server 101 extracts client computers that meet the conditions based on the client specifying condition information (1201). Then, the information image management server 101 sends information about the extracted client computers (extracted client information), for example, the number of extracted client computers and the like, to the advertising agency terminal 102 (1202).

Having received the extracted client information, the advertising agency terminal 102 presents the contents of this information to the operator in a recognizable manner. FIG. 13 shows an exemplary screen display of the extracted client information.

In the exemplary screen display, an area 1301 for displaying the advertising agency terminal ID, an area 1302 for displaying the previously inputted extraction conditions, an area 1303 for displaying the number of extracted client computers, an area 1304 for displaying the cost for distributing an information image to the extracted clients, a cancel button 1305, and an update execution button 1306 are displayed. In the area 1302 for displaying the inputted extraction conditions, the extraction conditions previously specified at step 611 are displayed without any change so that the operator can confirm the contents of the extraction conditions. In the area 1303 for displaying the number of extracted client computers, the number of extracted clients is displayed. Thus, the operator of the advertising agency terminal 102 can confirm whether the number of extracted clients is appropriate or not. In the area 1304 for displaying the distribution cost, for example, an amount calculated by multiplying the number of clients by the distribution cost for each client is displayed. Thus, the operator of the advertising agency terminal 102 can determine whether the number of extracted clients is appropriate or not in view of the cost.

If, having reviewed the number of extracted clients and the distribution cost displayed as described above, the operator of the advertising agency terminal 102 wants to stop distributing an updated or added information image or to change the extraction conditions, the operator presses the cancel button 1305 to go back to the previous screen. On the other hand, if the operator of the advertising agency terminal 102 has decided to distribute an updated or added information image on the displayed conditions, the operator presses the update execution button 1306.

Referring again to FIG. 12, if the update execution button 1306 is pressed, the advertising agency terminal 102 generates an information image update decision notification signal at the information image update decision notifying unit 1101 and transmits this signal to the information image management server 101 via the network 104 (1203).

Having received the information image update decision notification signal, the information image management server 101 transmits the updated or added information image to the client computers extracted at step S1201 on the basis of the client specifying condition information provided at step S611 (613, 614). The transmission of the updated or added information image, the registration of the information image in the management area of each client (615, 616), the transmission of a notification that the information image is registered (617, 618), and the update of the database of the client information recording unit at the information image management server (619, 620) are similar to the processing in the first embodiment.

(3.3. Advantage of Present Embodiment)

According to the present embodiment, since an information image can be distributed selectively only to a specific client computer from the advertising agency terminal, it is possible to quickly improve the effect of information distribution. Moreover, since an information image is actually distributed after inputting client extraction conditions from the advertising agency terminal and grasping the number of information distributions, estimation of the cost of information distribution is made quick and easy. Thus, the advertising agency can review and change the advertisement distribution plan in real time in view of the number of distributions and the cost.

(4. Third Embodiment)

A third embodiment of the present invention will now be described. The third embodiment is different from the first and second embodiments in that attribute information of client computers are collected and recorded. Therefore, in the present embodiment, it is possible to set more detailed extraction conditions by using the attribute information as extraction conditions in extracting the client computers, and an advertisement provider or the like can provide more detailed review information by providing the attribute information of each of the extracted client computers to the advertising agency terminal 102.

(4.1. Structure and Operation of Third Embodiment)

The present embodiment can be used in combination with either the first embodiment or the second embodiment. Hereinafter, the present embodiment combined with the second embodiment will be described as an example. The overall structure of the system of the present embodiment is similar to the structure shown in FIG. 1.

Figures 14, 15:
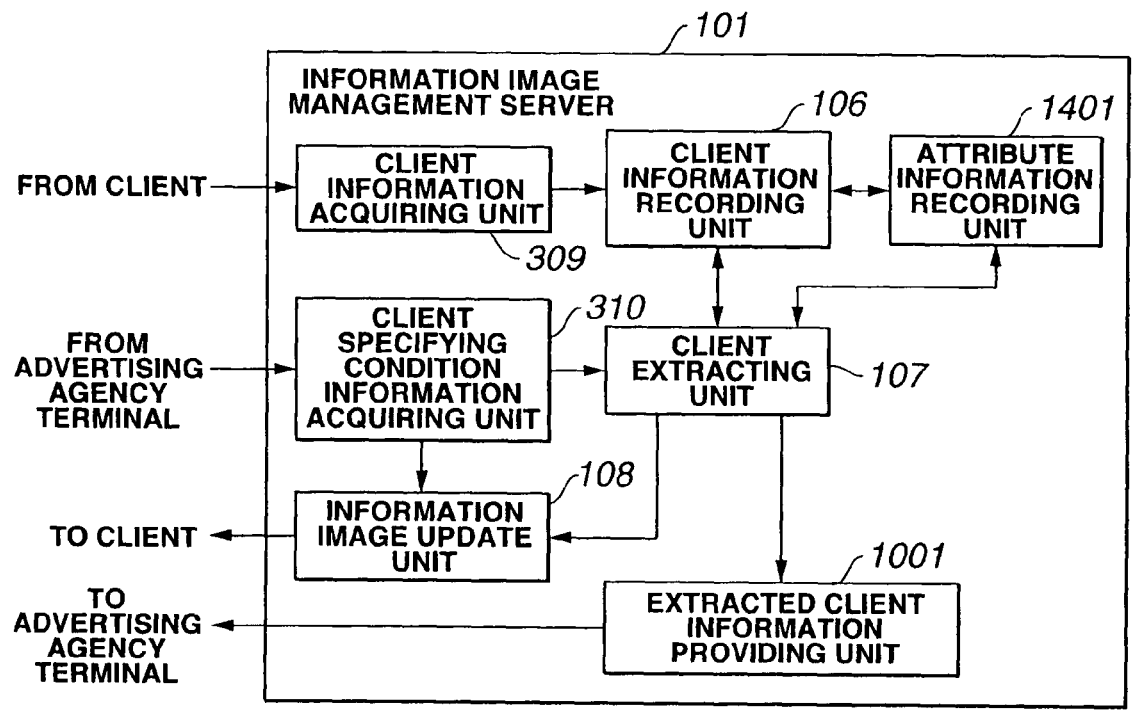
FIG. 14 shows an exemplary structure of an information image management server according to a third embodiment.
FIG. 15 shows an exemplary structure of an attribute information recording unit in the third embodiment.

FIG. 14 shows an exemplary structure of an information image management server 101 according to the present embodiment. The information image management server 101 shown in FIG. 14 has a structure similar to the structure shown in FIG. 10 except that an attribute information recording unit 1401 connected to a client extracting unit is provided.

The attribute information recording unit records attribute information of each client computer. "Attribute information" means personal data about an operator of a client computer. For example, "attribute information" in this case includes age, sex, occupation, taste, hobby and the like.

FIG. 15 shows an exemplary structure of the attribute information recording unit 1401. In this example, a field 1501 for storing client ID to specify a client computer, a field 1502 for storing the age of the operator of the client, a field 1503 for storing the sex of the operator, a field 1504 for storing the occupation of the operator and a field 1505 for storing the interests of the operator are provided in each record, and the corresponding data are stored in the respective fields.

In FIG. 14, the attribute information recording unit 1401 is shown as a constituent element separate from the client information recording unit 106, for example, a separate table or database. However, the attribute information recording unit 1401 may be constituted as a part of the client information recording unit 106.

The data stored in the attribute information recording unit 1401 is sent from each client computer to the information image management server 101 and then stored therein.

Figure 16:
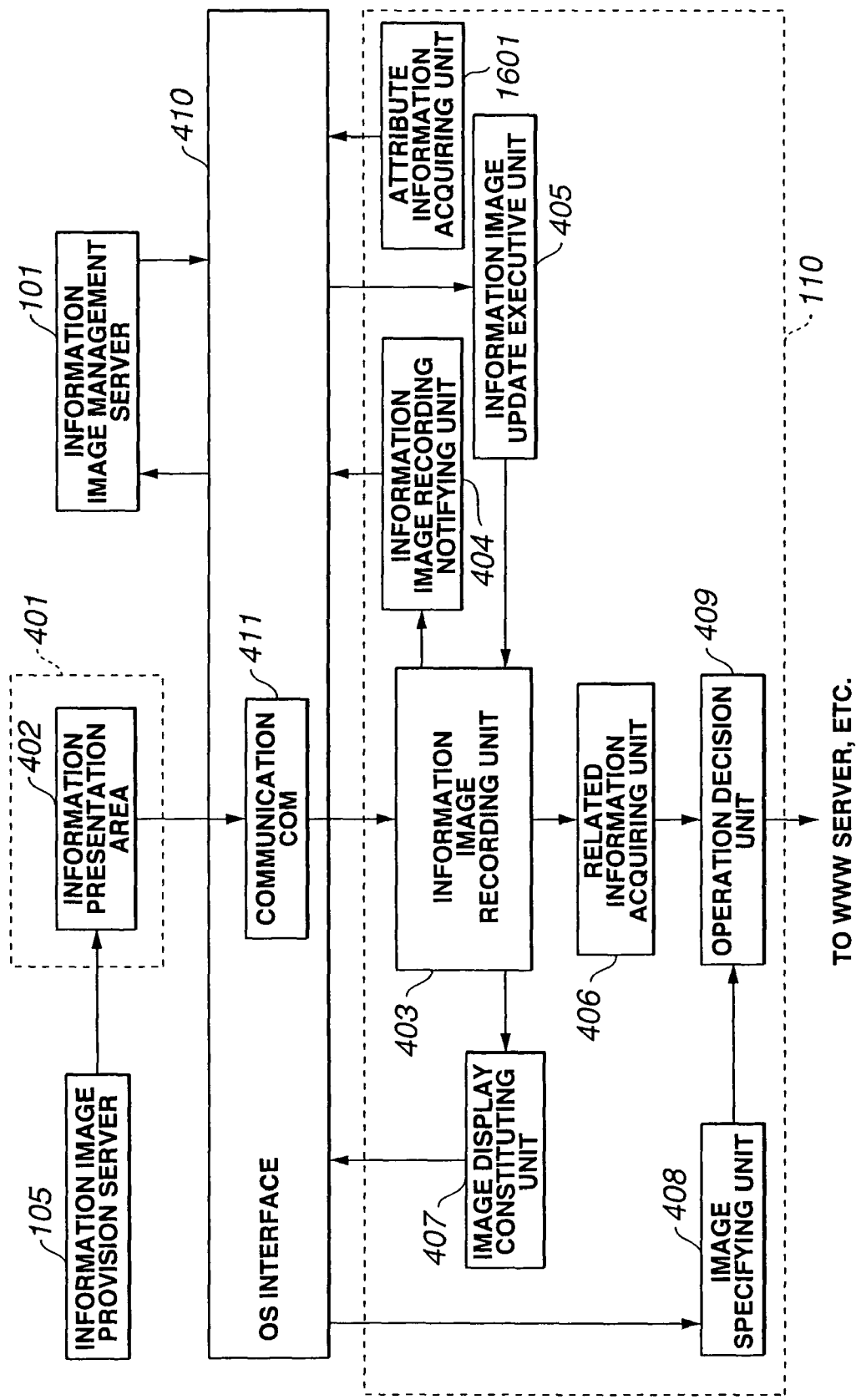
FIG. 16 shows an exemplary structure of a client computer in the third embodiment.

FIG. 16 shows an exemplary structure of a client computer in the present embodiment. The structure of the client is similar to the structure shown in FIG. 4 except that a management area 110 has an attribute information acquiring unit 1601. Therefore, the same components are denoted by the same numerals.

Figure 17:
FIG. 17 shows an exemplary attribute information input screen at the client computer.

FIG. 17 shows an exemplary input screen for prompting the operator of the client computer to input the attribute information. This screen may be displayed, for example, when a program for executing the management area 110 is installed, or may be started up at another timing. This screen may be generated by the attribute information acquiring unit 1601.

The operator inputs the attribute information such as his/her age, sex, occupation, taste and hobby in accordance with this input screen. On completion of the input, the attribute information acquiring unit 1601 of the management area 110 transmits the inputted attribute information to the information image management server 101. Having received the attribute information, the information image management server 101 stores the information image in association with the client ID to the attribute information recording unit 1401.

A client extracting unit 107 is constituted to search the attribute information recording unit 1401 and acquire desired information. Thus, it is possible to contain the condition related to the attribute information into the client extraction conditions from advertising agency terminal 102. For example, client extraction conditions are set such that a client computer has recorded an information image X, is a male of an age of 20 to 30, and is interested in music. Referring to the client information recording unit 106 and the attribute information recording unit 1401, the client extracting unit 107 extracts client computers who meet these conditions.

Since the attribute information recording unit 1401 is provided, the detailed information about the clients extracted from the advertising agency terminal 102 can be provided. FIG. 18 shows an exemplary extraction result display screen displayed by the advertising agency terminal 102. This exemplary screen is basically similar to the exemplary screen shown in FIG. 13 but it is different in that a button 1801 for requesting detailed display is provided.

When the operator of the advertising agency terminal 102 wants to see the detailed information about the extracted client computers, the operator presses the button 1801. If the button 1801 is pressed, the advertising agency terminal 102 request the information image management server 101 to provide the detailed information. In response to this request, the server 101 acquires from the attribute information recording unit 1401 the attribute information of each of the client computers extracted by the client extracting unit 107, and sends the attribute information back to the advertising agency terminal 102. FIG. 19 shows an exemplary screen for displaying the detailed information in accordance with the pressing of the button 1801. Having received the detailed information, the advertising agency terminal 102 displays it on the screen shown in FIG. 19. In this screen, an area 1901 is provided for displaying the detailed information about each of the extracted client computers, and the detailed information is displayed in this area.

The operator of the advertising agency terminal 102 can review the detailed information and can instantly review whether a desired client computer is extracted or not.

By pressing a return button 1902 on completion of the review, the operator can go back to the screen shown in FIG. 18 and continue the processing.

(4.2. Advantage of Present Embodiment)

According to the present embodiment, the operator of the advertising agency terminal 102 can carry out more appropriate distribution information by using attribute information about client computers.

(5. Others)

(5.1. Accounting)

By adding an accounting function unit in the information image management server 101, it is possible to construct a system which is more useful for business. Specifically, the information image management server may record that an image information image update or addition message has been transmitted to a client computer, and the information image management server may calculate the number of distributions from this recording, thus carrying out accounting. In this case, an accounting calculating unit may be added within the information image management server so as to acquire ID proper to the advertising agency terminal along with the form input and calculate accounting information for each advertising agency by using the ID.

(5.2. Hierarchy of Information Image Management Server)

While the information image management server 101 is described as a single server in the above-described embodiments, it may be constituted by a plurality of hierarchically ordered or layered servers. For example, the functions of the information image management server 101 may be shared by an application server having the client extracting unit 107 and the information image update unit 108, and a database server connected to the application server and having the client information recording unit 106.

(5.3. Management Area, Client Specifying Condition Information Processing Unit, etc.)

Any of the management area 110 of the client computer 103, the client specifying condition information processing unit 111 of the advertising agency terminal 102, and the other constituent elements described above may be realized by a program installed in the corresponding information equipment terminal, or may be realized by a distribute object (Java Applet, Active X, etc.) which is downloaded from a predetermined server and then executed.

Alternatively, these components may be realized by a back-end based on a distributed platform stored on another server connected to the network 104.

As is described above, according to the present invention, a client having specific conditions can be extracted by using an information image and update or addition of the information image can be carried out only for this client computer. Therefore, the effect of information distribution can be quickly improved.

INDUSTRIAL APPLICABILITY

The present invention can be applied to a system such that an information provider can provide an information image which the information provider wants to be visually recognized by a target customer, that is, a terminal user who meets conditions based the information provider's own marketing strategy or the like, by using a network or the like.

The invention claimed is:

1. An information image management method comprising:

receiving notification of a first information image recorded in a management area of a first client computer by a user-initiated drag-and-drop operation on the first information image included on a web page provided to the first client computer;

associating a client ID uniquely identifying the first client computer with an information image ID corresponding to the first information image, indicating that the first client computer has recorded the first information image into the management area;

receiving, from an advertising agency terminal, client selection criteria including a plurality of information image values,
wherein the client selection criteria is entered by a user in a first input portion on a single user input form, the first input portion allowing the user to enter a plurality of information image ID values as search conditions, and further allowing the user to specify a logical operator for performing a search using a combination of the plurality of information ID values,
the single user input form displaying, in combination with the first input portion, an information image corresponding to each of the plurality of information image ID values in a preview portion of the single user input form for visual confirmation,
the single user input form further comprising a second input portion in combination with the first input portion and the preview portion for entering, by the user, an identifier of the advertising agency terminal;

searching a client information recording unit, on the basis of the client selection criteria, for client computers which satisfy the client selection criteria, and providing a listing of client computers which satisfy the client selection criteria;

sending, to the advertising agency terminal, the listing of client computers, the advertising agency terminal presenting to the user a total number of client computers satisfying the client selection criteria, a cost for distributing a second information image to the client computers, and the client selection criteria;

receiving, from the advertising agency terminal, client specifying information of the client computers satisfying the client selection criteria, wherein the client specifying information includes client IDs uniquely identifying the client computers satisfying the client selection criteria;

transmitting, to the client computers, the second information image for addition to, or replacement of, the first information image; and receiving notification of the second information image being recorded in the client computers;
wherein the first information image comprises first image information, and first related information incorporated into a comment extension portion of the first image information, and wherein:
the comment extension portion contains non-graphical text information comprising names of parties concerned with production of the first image information, and an explanation of the contents of the first image information, the first related information is a program operable to perform specific processing for the first image information, and the first image information and the first related information are packaged together as a single piece of data;

wherein the second information image comprises second image information, and second related information incorporated into a comment extension portion of the second image information, and wherein:

the comment extension portion contains non-graphical text information comprising names of parties concerned with production of the second image information, and an explanation of the contents of the second image information, the second related information is a program operable to perform specific processing for the second image information, and the second image information and the second related information are packaged together as a single piece of data; and wherein the specific processing comprises acquiring new image information from a server.

2. The information image management method as claimed in claim 1, further comprising generating retrieved client information on the basis of the client specifying information, supplying the retrieved client information to an advertising agency terminal, and transmitting, to the client computers, the second information image upon receipt of a notification from the advertising agency terminal.

3. The information image management method as claimed in claim 1, further comprising acquiring attribute information about the first client computer and recording the attribute information in association with the client specifying information.

4. A computer-readable storage medium in which an information image management program is stored, the information image management program causing a computer to execute an information image management method comprising:

receiving notification of a first information image recorded in a management area of a first client computer by a user-initiated drag-and-drop operation on the first information image included on a web page provided to the first client computer;

associating a client ID uniquely identifying the first client computer with an information image ID corresponding to the first information image, indicating that the first client computer has recorded the first information image into the management area;

receiving, from an advertising agency terminal, client selection criteria including a plurality of information image values, wherein the client selection criteria is entered by a user in a first input portion on a single user input form, the first input portion allowing the user to enter a plurality of information image ID values as search conditions, and further allowing the user to specify a logical operator for performing a search using a combination of the plurality of information ID values, the single user input form displaying, in combination with the first input portion, an information image corresponding to each of the plurality of information image ID values in a preview portion of the single user input form for visual confirmation, the single user input form further comprising a second input portion in combination with the first input portion and the preview portion for entering, by the user, an identifier of the advertising agency terminal;

searching a client information recording unit, on the basis of the client selection criteria, for client computers which satisfy the client selection criteria, and providing a listing of client computers which satisfying the client selection criteria;

sending, to the advertising agency terminal, the listing of client computers, the advertising agency terminal presenting to the user a total number of client computers satisfying the client selection criteria, a cost for distributing a second information image to the client computers, and the client selection criteria;

receiving, from the advertising agency terminal, client specifying information of the client computers satisfying the client selection criteria, wherein the client specifying information includes client IDs uniquely identifying the client computers specifying the client selection criteria;

transmitting, to the client computers, the second information image for addition to, or replacement of, the first information image; and receiving notification of the second information image being recorded in the client computers;

wherein the first information image comprises first image information, and first related information incorporated into a comment extension portion of the first image information, and wherein:

the comment extension portion of the first image information contains non-graphical text information comprising names of parties concerned with production of the first image information, and an explanation of the contents of the first image information, the first related information is a program operable to perform specific processing for the first image information, and the first image information and the first related information are packaged together as a single piece of data;

wherein the second information image comprises second image information, and second related information incorporated into a comment extension portion of the second image information, and wherein:

the comment extension portion of the second image information contains non-graphical text information comprising names of parties concerned with production of the second image information, and an explanation of the contents of the second image information, the second related information is a program operable to perform specific processing for the second image information, and the second image information and the second related information are packaged together as a single piece of data; and wherein the specific processing comprises acquiring new image information from a server.

* * * * *